(12) United States Patent
Weingardt et al.

(10) Patent No.: US 9,361,762 B2
(45) Date of Patent: Jun. 7, 2016

(54) ONLINE FANTASY GAMING TOURNAMENT SYSTEM AND METHOD THEREFOR

(71) Applicant: GAMING GRIDS, LLC, Las Vegas, NV (US)

(72) Inventors: Gary Weingardt, Las Vegas, NV (US); Travis N Howle, La Center, KY (US); Dana Garvey, Torrance, CA (US)

(73) Assignee: GAMING GRIDS, LLC, Las Vegas, NV (US)

( * ) Notice: Subject to any disclaimer, the term of this patent is extended or adjusted under 35 U.S.C. 154(b) by 0 days.

(21) Appl. No.: 14/790,942

(22) Filed: Jul. 2, 2015

(65) Prior Publication Data

US 2015/0348373 A1     Dec. 3, 2015

Related U.S. Application Data

(63) Continuation-in-part of application No. 14/290,793, filed on May 29, 2014, now Pat. No. 9,123,205.

(51) Int. Cl.
*G07F 17/32* (2006.01)
*A63F 13/53* (2014.01)

(52) U.S. Cl.
CPC ............ *G07F 17/3295* (2013.01); *A63F 13/53* (2014.09); *G07F 17/3211* (2013.01); *G07F 17/3237* (2013.01); *G07F 17/3244* (2013.01); *G07F 17/3258* (2013.01); *G07F 17/3276* (2013.01)

(58) Field of Classification Search
USPC ............................................. 463/27, 28, 42
See application file for complete search history.

(56) References Cited

U.S. PATENT DOCUMENTS

| | | | |
|---|---|---|---|
| 6,093,100 A | 7/2000 | Singer et al. | |
| 8,038,535 B2 | 10/2011 | Jensen | |
| 8,360,844 B2 * | 1/2013 | Schwartz | G07F 17/3211 463/17 |
| 8,663,012 B2 | 3/2014 | Weingardt | |
| 2006/0247060 A1 | 11/2006 | Hanson et al. | |
| 2006/0287106 A1 | 12/2006 | Jensen | |
| 2008/0009344 A1 | 1/2008 | Graham et al. | |
| 2009/0117962 A1 | 5/2009 | Flipour et al. | |
| 2009/0170583 A1 | 7/2009 | Moody | |
| 2011/0057391 A1 * | 3/2011 | Wong | A63F 1/00 273/292 |
| 2011/0223983 A1 * | 9/2011 | Schwartz | G07F 17/3211 463/17 |
| 2011/0319175 A1 * | 12/2011 | Jensen | A63F 13/12 463/42 |
| 2014/0141868 A1 | 5/2014 | Kelly et al. | |

* cited by examiner

*Primary Examiner* — Pierre E Elisca
(74) *Attorney, Agent, or Firm* — Weiss & Moy, P.C.; Veronica-Adele R. Cao

(57) ABSTRACT

Disclosed herein is a fantasy video gaming system having a server and including a processor for executing computer program instructions and having a memory coupled to the processor for storing the computer program instructions, the programming instructions comprising: establishing at least one online video gaming tournament; accepting participants entry into the online fantasy video gaming tournament. The fantasy video gaming system may be capable of taking and distributing compiled player statistics and metrics to third-party subscribers, wherein the player statistics and metrics represent the overall performance of a single player, group of players, or a team of players across multiple online video games for use in a large-scale fantasy game scoring.

54 Claims, 14 Drawing Sheets levels 1-9

Levels 5 - 14

Levels 9 - 19

Levels 14 - 24

Levels 19 - 29

Levels 24 - 34

Levels 29 - 39

Levels 34 - 44

Levels 39 - 50

FIGURE 10

ONLINE FANTASY GAMING TOURNAMENT SYSTEM AND METHOD THEREFOR

CROSS-REFERENCE TO RELATED APPLICATIONS

The present patent application claims the benefit of U.S. application Ser. No. 14/290,793 filed May 29, 2014, entitled "An Online Gaming Tournament System Having Prizes for Players in Winning Categories and Method Therefore," which in turn claims the benefit of U.S. Provisional Application No. 61/831,045, filed Jun. 4, 2013, entitled "Gaming-Grids.com Tournaments" in the name of the same inventors, and which are incorporated herein by reference in their entirety. The present patent application is further related to U.S. Pat. No. 8,663,012, entitled "Networked, Electronic Game Tournament Method and System, in the name of Gary Weingardt, and is hereby specifically incorporated herewith by reference for all purposes and in all sections of the specification.

TECHNICAL FIELD

This invention relates generally to an online video gaming system, and more particularly to a video online gaming tournament that utilizes groups of players receiving prizes in their winning category(s), progressive jackpots, the collection and distribution of overall game performance for use in a large-scale fantasy game, and other features designed to increase the attractiveness and excitement of the game to the players.

BACKGROUND

With the advent of wired and wireless communication networks (i.e., Internet), online computer gaining has become increasingly popular with many people. Online services may allow for video game players to play against other players from all over the world. With such a large pool of potential players, there is a correspondingly large range of player abilities, ranging from the first-time or occasional player to the daily, devoted fan and even on to the ranks of professional video game players.

Some organized competitions, such as tournaments, may attempt to match players of equal skill. These online multi-player tournaments have typically been in a "Bracket" or tree diagram or Ladder format which has limited availability consisting of the top players or teams. Because of this, many people who may wish to participate opt not to as these players may not qualify or may feel that they are not "good enough" to participate. Further, these online multi-player tournaments generally only award the winning players or teams. Some consolation prizes may be awarded. However, the vast majority of players generally have no realistic chance of winning any prize. As one can imagine, the really large global tournaments, under the present system, provide the average player with a very small opportunity of success. In fact, the most lucrative market, currently, is the Massively Multiplayer Online game tournament or MMO. These MMO tournaments attract huge gamer interest, but also presently provide little opportunity for the average player to be rewarded. Additionally, the Massively Multiplayer Online Role-Playing Game tournaments (MMORPG) require huge amounts of computer attention, time and storage space. There is no presently known computer system, including hardware and software capable of handling the statistics required and thus, the vast majority of players are left without proper customer service, creating a significant issue in the industry.

Fantasy sports have also been of particularly growing interest. A fantasy sport is a game wherein participants act as team owner. The object is to build a team of players that competes against other fantasy owners based on the statistics generated by the real-life individual players or teams of a professional sport (e.g. football). There is no presently known computer system, including hardware and software that is capable of taking multiple statistics and metrics of various online video games for a single player (or group of players) that may be used to track and report that player's (or group's) overall performance across all games for use in a large-scale fantasy game. This long-felt need for such a computer system has also been present since the inception of online video games and fantasy sports.

Therefore, it is desirable to provide a new system and method that overcomes the above issues. The new system and method should, preferably, be open to the massive public audiences (MMO) with rewards being presented to the majority of participants and at the same time rewarding the few outstanding players with progressive jackpots as well as other rewards systems. What is also needed to overcome existing issues is the computing ability to handle the massive amount of statistics, for example, present in an MMORPG. The new system and method should also, preferably, be capable of taking and distributing player statistics and metrics that represent player overall performance across multiple online video games for use in a large-scale fantasy game.

SUMMARY OF THE INVENTION

This summary is provided to introduce a selection of concepts of the present invention in a simplified form that are further described in detail below in the DETAILED DESCRIPTION OF THE INVENTION. This summary is not intended to identify each and every key feature of the invention, which remains the exclusive purview of claims, nor is the Summary intended to be used as an aid in determining the scope of the claimed subject matter.

In accordance with one exemplary embodiment of the present application, a video gaming system is disclosed. The video gaming system has a server having a processor for executing program instructions and a memory coupled to the processor for storing the program instructions, the programming instructions comprising: establishing at least one online video gaming tournament; accepting participants entry into the online video gaming tournament; establishing a tournament pool, which includes a system of rewards, both monetary and non-monetary, a percentage of the rewards is distributed as winnings; distribution of the winnings upon completion of the video gaming tournament. Additionally, this embodiment uses a statistical server to keep track of gamer information including results of particular battles or engagements as well as skills achieved and levels earned as well as the result of each contest and the opponents relative strength.

In accordance with another exemplary embodiment of the present application, an online video gaming tournament system is disclosed. In this exemplary embodiment, the online video gaming tournament system has a plurality of video gaming servers for hosting a plurality of online video gaming tournaments, wherein the plurality of online video gaming tournaments comprise at least one global online video gaming tournaments and at least one regional online video gaming tournaments. A statistical server is coupled to the plurality of video gaming servers having a processor for executing program instructions and a memory coupled to the processor for storing the program instructions, the programming instructions comprising: accepting of entry fee by participants in the online video gaming tournaments; establishing a tournament pool, wherein a percentage of monies from the entry fee collected is distributed as winnings; establishing a dynamic participant ranking grid, wherein a position of the participant on the dynamic participant ranking grid moves during and after the online video gaming tournaments, wherein performance of the participant in-game and skill ranking differential between at least two participants determine movement on the dynamic participant ranking grid; establishing at least one progressive jackpot, the at least one progressive jackpot is awarded based on skill based on one of: achievements in the online video gaming tournament or combinations of skill sets or sequential skills or skill sets performed in the online video gaming tournament; and payment of winnings after the video gaming tournaments have expired.

In accordance with another exemplary embodiment of the present application, an online video gaming tournament system is disclosed. The online video gaming tournament system has a plurality of video gaming servers for hosting a plurality of online video gaming tournaments, wherein the plurality of online video gaming tournaments comprise at least one global online video gaming tournaments and at least one regional online video gaming tournaments. A statistical server is coupled to the plurality of video gaining servers having a processor for executing program instructions and a memory coupled to the processor for storing the program instructions, the programming instructions comprising: accepting of entry fee by participants in the online video gaming tournaments; establishing a tournament pool, wherein a percentage of monies from the entry fee collected is distributed as winnings and a percentage of monies from the entry fee collected is distributed to predetermined non-winning participants; establishing a dynamic participant multi-level, multi-tier ranking grid, wherein a position of the participant on the dynamic participant ranking grid moves during and after the online video gaming tournaments, wherein performance of the participant in-game and skill ranking differential between at least two participants determine movement on the dynamic participant ranking grid; establishing a plurality of progressive jackpots, wherein at least one of the plurality of progressive jackpots is awarded based on skill based on one of: achievements in the online video gaming tournament or combinations of skill sets or sequential skills or skill sets performed in the online video gaming tournament; establishing virtual participant bank accounts, payment of winnings distributed and contained within the virtual participant bank account of the winning participants; and payment of winnings after the video gaming tournaments have expired, payment of winnings based on statistical game performance.

In accordance with another exemplary embodiment of the present application, an online video gaining tournament system is disclosed, which includes a server having a processor for executing program instructions and a memory coupled to the processor for storing the program instructions. The programming instructions include establishing at least one online video gaming tournament, accepting an entry fee by participants in the online video gaining tournament; establishing a tournament pool. In this exemplary embodiment, a percentage of monies from the entry fee collected are distributed as winnings; and there exists at least one progressive jackpot. The one progressive jackpot is awarded based on skill based achievements.

In accordance with another exemplary embodiment of the present application, an online video gaining tournament system is disclosed. The video gaming system has a server having a processor for executing program instructions and a memory coupled to the processor for storing the program instructions, the programming instructions comprising: establishing at least one online video gaming tournament; accepting of entry fee by participants in the online video gaining tournament; establishing a tournament pool, wherein a percentage of monies from the entry fee collected is distributed as winnings; and establishing a consolation prize system to pay non-winning participants a percentage of monies from the entry fee collected.

In accordance with another embodiment of the present invention, a video gaining system is disclosed. The video gaming system has a plurality of video gaming servers for hosting online video gaming tournaments and a plurality of third-party subscriber servers for hosting at least one fantasy game. The video gaming system also comprises: a statistical server having a bidirectional application programming interface, the bidirectional application programming interface configured to: receive raw performance data relating to each of two or more video games being played on the video gaming servers; determine whether the raw performance data relating to each of the two or more video games being played is relevant to the at least one fantasy game; aggregate the raw performance data that is determined to be relevant to the at least one fantasy game; store the raw aggregated performance data on the statistical server; calculate compiled summation of performance scores over all of the video games being played on the video gaining servers based on the raw aggregated performance data stored on the statistical server; and transmit at least one of the raw aggregated performance data and the compiled summation of performance scores to the third-party subscriber servers; the statistical server being coupled to the plurality of video gaining servers, being coupled to the third-party subscriber servers, and having a processor for executing program instructions and a memory coupled to the processor for storing the program instructions, the programming instructions comprising: establishing at least one online video gaming tournament; accepting by the statistical server entry of a plurality of participants into the at least one online video gaming tournament; and establishing by the bidirectional application programming interface a dynamic participant ranking grid, the dynamic participant ranking grid updating based on performance of each participant of the plurality of participants in-game, wherein a position of individual participants of the plurality of participants on the dynamic participant ranking grid moves during and after the online video gaming tournament.

In accordance with another embodiment of the present invention, a fantasy video gaming system is disclosed. The fantasy video gaming system has a plurality of video gaming servers for hosting online video gaming tournaments and a plurality of third-party subscriber servers for hosting at least one fantasy game. The fantasy video gaining system also comprises: a statistical server having a bidirectional application programming interface, the bidirectional application programming interface configured to: receive raw performance data relating to at least one video game being played on the video gaming servers; determine whether the raw performance data relating to the at least one video game being played is relevant to the at least one fantasy game; aggregate the raw performance data that is determined to be relevant to the at least one fantasy game; calculate compiled summation of performance scores over the at least one video game being played on the video gaming servers based on the raw aggregated performance data; and transmit at least one of the raw aggregated performance data and the compiled summation of performance scores to the third-party subscriber servers for use in the at least one fantasy game; the statistical server being coupled to the plurality of video gaining servers, being coupled to the third-party subscriber servers, and having a processor for executing program instructions and a memory coupled to the processor for storing the program instructions, the programming instructions comprising: establishing at least one online video gaming tournament; accepting by the statistical server entry of a plurality of participants into the at least one online video gaming tournament; and establishing by the bidirectional application programming interface a dynamic participant ranking grid, the dynamic participant ranking grid updating based on performance of each participant of the plurality of participants in-game, wherein a position of individual participants of the plurality of participants on the dynamic participant ranking grid moves during and after the online video gaming tournament.

In accordance with another embodiment of the present invention, a fantasy video gaming system is disclosed. The fantasy video gaming system comprises: a plurality of video gaining servers for hosting a plurality of online video gaming tournaments based on a plurality of video games being played on the video gaming servers; a plurality of third-party subscriber servers for hosting at least one fantasy game; a statistical server having a bidirectional application programming interface, the bidirectional application programming interface configured to: receive raw performance data relating to each of the plurality of video games being played on the video gaming servers; determine whether the raw performance data relating to each of the plurality of video games being played is relevant to the at least one fantasy game; aggregate the raw performance data that is determined to be relevant to the at least one fantasy game; calculate compiled summation of performance scores over all of the video games being played on the video gaming servers based on the raw aggregated performance data; and transmit at least one of the raw aggregated performance data and the compiled summation of performance scores to the third-party subscriber servers for use in the at least one fantasy game; the statistical server being coupled to the plurality of video gaming servers, being coupled to the third-party subscriber servers, and having a processor for executing program instructions and a memory coupled to the processor for storing the program instructions, the programming instructions comprising: establishing a plurality of online video gaming tournaments; accepting by the statistical server entry of a plurality of participants into the plurality of online video gaming tournaments; and establishing by the bidirectional application programming interface a dynamic participant ranking grid, the dynamic participant ranking grid updating based on performance of each participant of the plurality of participants in-game, wherein a position of individual participants of the plurality of participants on the dynamic participant ranking grid moves during and after the online video gaming tournaments, wherein overall performance of the participant in-game and skill ranking differential between at least two participants determine movement on the dynamic participant ranking grid.

In accordance with another embodiment of the present invention, a fantasy video gaming system is disclosed. The fantasy video gaming system comprises: a statistical server having a bidirectional application programming interface, the bidirectional application programming interface configured to: receive raw performance data relating to at least one game being played on a plurality of video gaming servers; determine whether the raw performance data relating to the at least one game being played is relevant to at least one fantasy game; aggregate the raw performance data that is determined to be relevant to the at least one fantasy game; calculate compiled summation of performance scores over the at least one video game being played on the video gaming servers based on the raw aggregated performance data; and transmit at least one of the raw aggregated performance data and the compiled summation of performance scores to a plurality of third-party subscriber servers for use in the at least one fantasy game; the statistical server being coupled to the plurality of video gaming servers, being coupled to the third-party subscriber servers, and having a processor for executing program instructions and a memory coupled to the processor for storing the program instructions, the programming instructions comprising: establishing at least one online video gaming tournament; and accepting by the statistical server entry of a plurality of participants into the online video gaming tournament.

It will be appreciated that the scope of the invention is not limited to games requiring an entry fee in any of the above or below described exemplary embodiments. Rather, the invention covers both fee and non-fee games. In fact, it is envisioned that the invention herein may well be used with so-called subscriber services. These are games where a subscriber pays the fees involved and not the participant. The participant merely pays the subscriber organization a regular fee, be it monthly, yearly or one-time fee or the like. The subscriber may then put on his own tournaments and all of his subscribers are automatically invited, for example.

BRIEF DESCRIPTION OF DRAWINGS

Embodiments of the disclosure will become more fully understood from the detailed description and the accompanying drawings, wherein:

FIG. 10 shows one example of the make-up of a player ranking cube used in the system of the present invention;

DETAILED DESCRIPTION OF THE INVENTION

The description set forth below in connection with the appended drawings is intended as a detailed description of presently known exemplary embodiments of the disclosure and is not intended to represent the only forms in which the present invention can, may, or could be constructed and/or utilized. The detailed description sets forth the functions and the sequence of the steps for constructing and operating the disclosure in connection with the illustrated embodiments as well as the best mode of carrying out the invention. It is to be understood, however, that the same or equivalent functions and sequences can be accomplished by different exemplary embodiments that are also intended to be encompassed within the spirit and scope of this invention.

The present system and method provides an online video gaming tournament. The present system and method utilizing the hundreds and thousands or even millions of existing multi-player garners and creates tournaments around them where not only are the players competing indirectly against other players in other regions and countries, but the players can also directly compete against other players while in the same game server on opposite teams or even on the same team. Players may not get eliminated from a tournament and continue to play until the tournament expires. The present system and method may provide two types of tournaments, non-entry-fee tournaments and entry-fee tournaments. Sometimes a subscriber service offers free tournaments that are put on by a particular subscriber service. These, too, are covered within the spirit and scope of the invention. It should be understood that where an entry-fee is paid for a tournament (whether the tournament is hosted on a game server 2 or a third-party subscriber server 20), the entry-fee may be paid by a participant or the entry-fee may be supplied or subsidized by a sponsor—both of which are covered within the spirit and scope of the invention.

Figure 1:
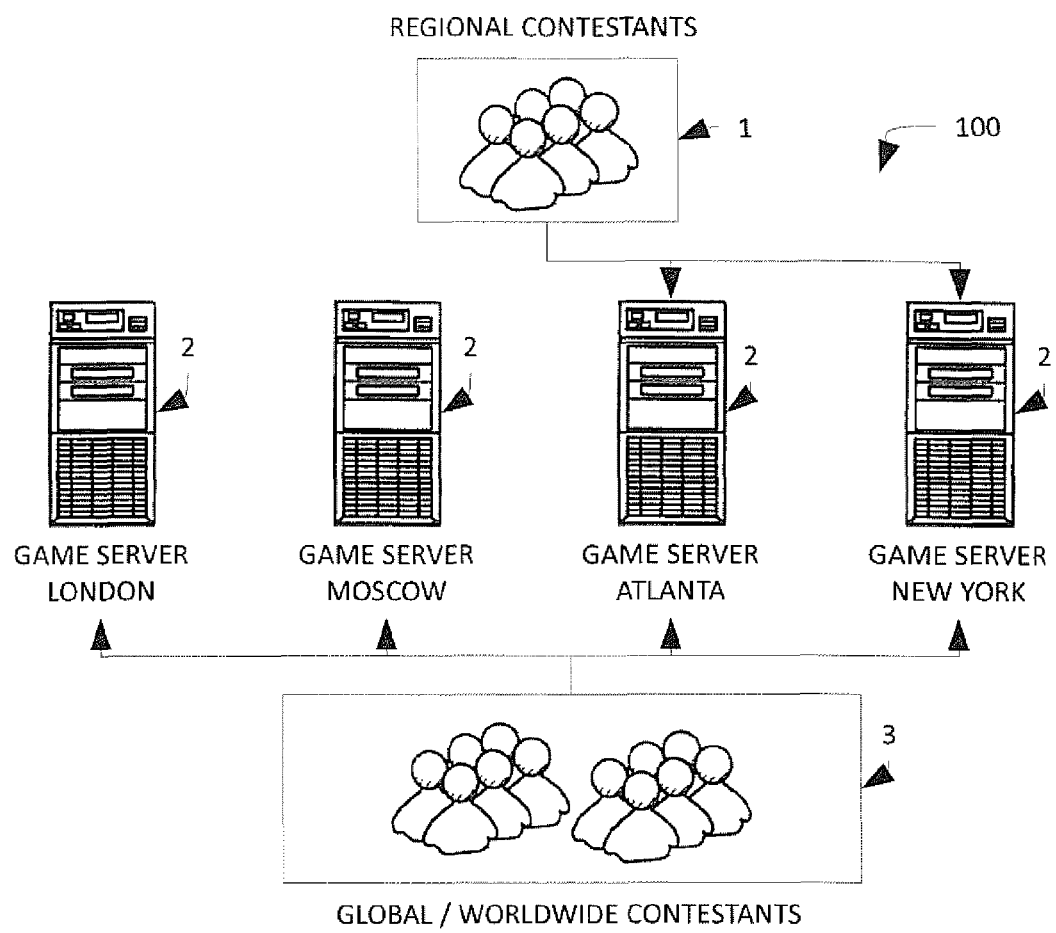
FIG. 1 is a simple block diagram of a system for playing Global and Regional Online Gaming Tournaments.

Referring to FIG. 1, the exemplary embodiment of the invention, the system, is illustrated in schematic and generally denoted by the numeral 100. The system 100 includes a plurality of game servers 2. The servers 2 are divided based upon certain criteria. As shown in FIG. 1, the servers 2 may be divided based on geographic location/region. However, other criteria are possible and such is not meant as limiting the disclosure of the invention in any way. The system 100 includes both regional contestants 1 who may wish to play in a regional online gaining tournament as well as global contestants 3 who may wish to play in a global online gaming tournament. The system 100 may allow regional contestants 1 and global contestants 3 to have the option to enter both global and regional online gaming Tournaments. Alternatively, within the spirit and scope of the invention, the system 100 may only include regional or exclusively include global tournaments. There may even be servers dedicated to particular game manufacturers or a particular category of games. In system 100, the tournaments are played on the same game servers 2, at the same time, but displayed on separate grids as will be more fully appreciated below. Thus, players can join a server 2 in Atlanta and participate in a global and regional online gaming tournament because a player's performance statistics can be used in each online gaming tournament individually. In the system 100, a contestants' performance statistics is calculated and compared against the other online gaming tournament contestants 1 or 3 and that calculation may be used to determine the player's grid ranking and their prize winnings.

The system 100, in the exemplary embodiment shown, uses servers 2 which are public servers. By having public gaming servers, the system 100 allows contestants 1 or 3 of the online gaming tournaments to play with non-tournament participants. This allows online gaming tournament contestants 1 or 3 to earn game statistics regardless of the amount of actual tournament participants. The use of public servers in the exemplary embodiment is not meant to be limiting of the invention. Within the spirit and scope of the invention, the system 100 uses private servers, semi-private servers and any other possible server, presently known or to be invented and discovered that would accomplish the purposes herein.

Figure 2:
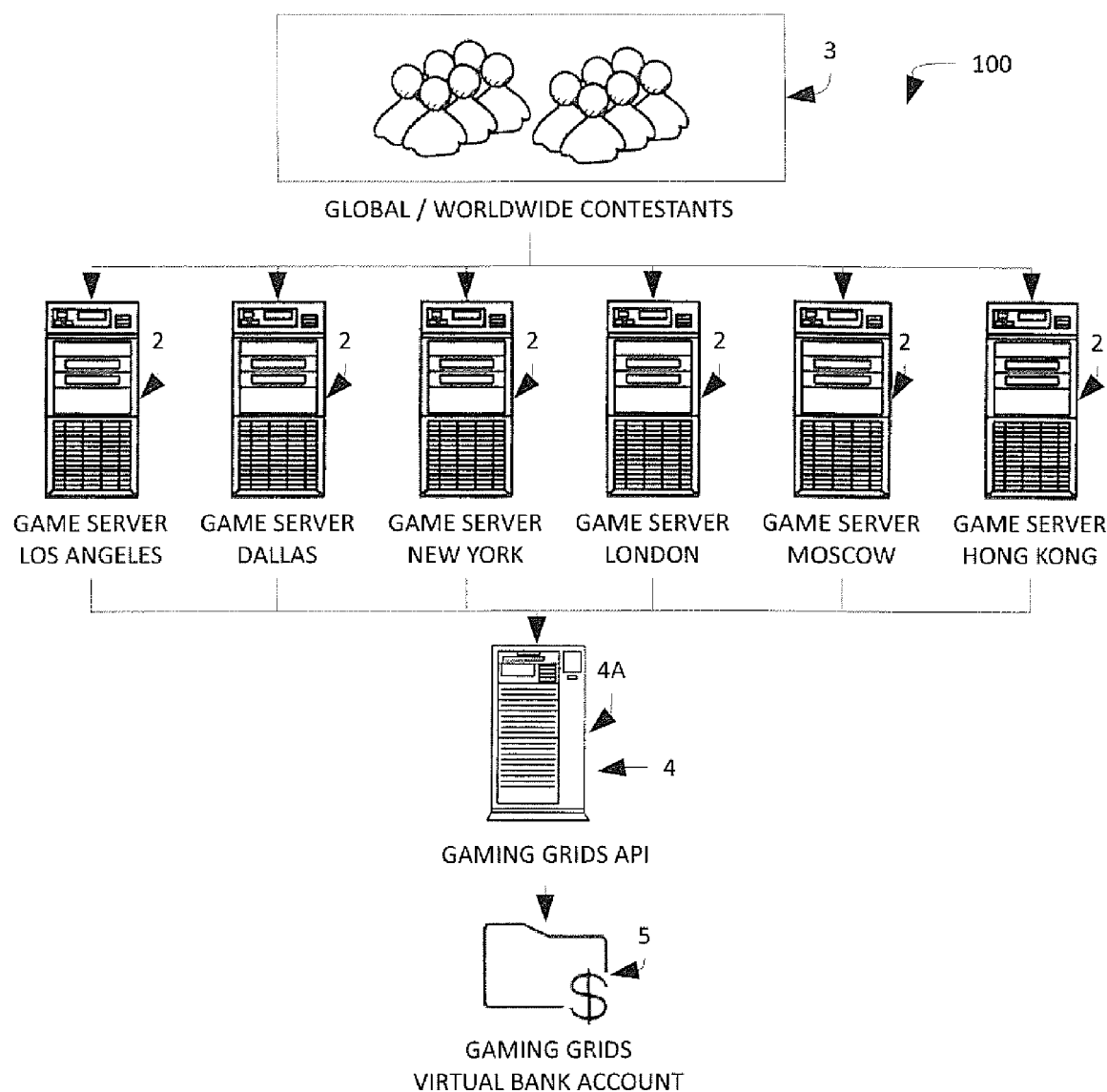
FIG. 2 is a simple block diagram of the system showing how players can play in the Global Online Gaming Tournaments.

Referring now to FIG. 2, a global tournament is described in detail. For a global tournament, global contestants 3 are able to access one or more gaming servers 2. In the exemplary embodiment shown in FIG. 2, the gaming servers 2 are coupled to an application programming interface (API) 4. The API 4 is used to calculate statistics related to the game being played on the servers 2. Global tournaments include gathering performance statistics for the global contestant 3 from all the game servers 2 around the world, from a given game and game type, and compiling them into a single ranking system determined by the API 4 to be displayed on the grid. For example, Player "A" located in Los Angeles, Calif., USA can indirectly compete against Player "B" located in London, England, UK without directly playing against one another.

In a Global tournament, the global contestants 3 generally pay an entry-fee. As shown in the exemplary embodiment of FIG. 2, the entry fee is taken from a player's bank account 5. The player's bank account 5 includes any type of account set-up by the player, be it real, brick and mortar store or virtual. The player's bank account 5 does not have to be an actual bank account but may be an online gaming account, virtual game account, a Paypal account, or the like. Once an entry fee has been paid from the player's bank account 5, the global contestants 3 may be directed to an official server list of games on the game servers 2 located around the world.

The global contestants 3 may then play on one or multiple official game servers 2 to obtain performance statistics. Those statistics may be calculated by the API 4 and that may be used to determine a global contestants 3 ranking and consequently their winnings. Once determined, the API 4 may transfer the winnings to the player's bank account 5 of the global contestants 3.

Figure 3:
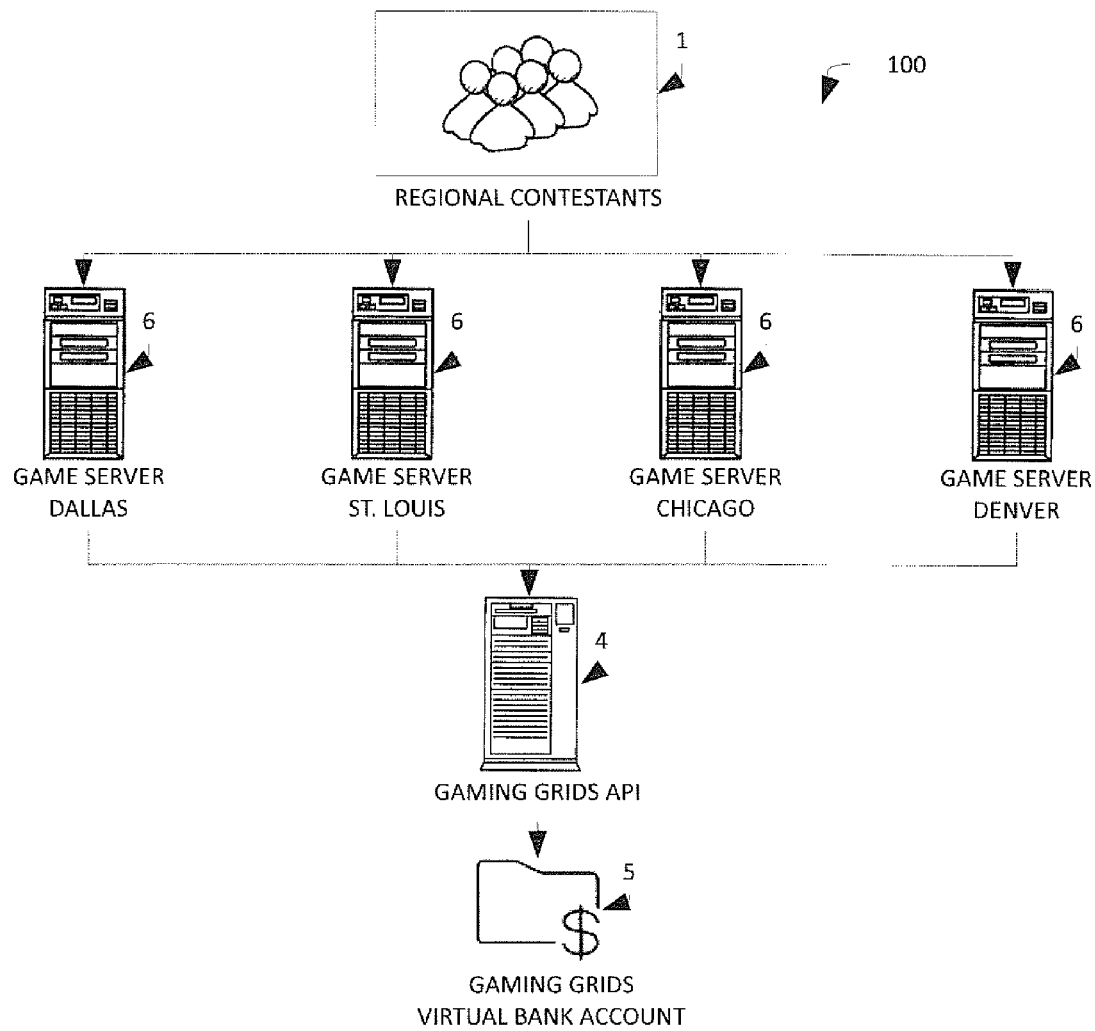
FIG. 3 is a simple block diagram of the system showing how players can play in the Regional Online Gaming Tournaments.

As illustrated in FIG. 3, a regional tournament will be described in more detail. For a regional tournament, regional contestants 1 access one or more regional gaming servers 6. The regional tournament consists of gathering performance statistics from specific regional game servers 6 in a given geographical location, such as United States West, specific states in the United States, or United Kingdom and compiling them via the API 4 into a single ranking system to be displayed on the Grid. Player "A" located in Los Angeles, Calif., USA can indirectly or directly compete with another player in the same region, such as Seattle, Wash., USA.

In a regional tournament, a regional contestant 1 may be required to pay an entry-fee. The entry fee may be taken from a player's bank account 5. The player's bank account 5 may be any type of account set-up by the regional contestants 1. The player's bank account 5 does not have to be an actual bank account but may be an online gaining account, virtual game account, a Paypal account, or the like. Once an entry fee has been paid from the player's bank account 5, the regional contestants 1 may be directed to an official server list on the regional game servers 6 located within a specific region. In this example, this regional online gaming tournament is taking place across Central United States. The player may then play in one or multiple official regional game servers 6 within a region to obtain performance statistics. Those statistics may be calculated and compared against other regional contestants 1 through the API 4 and may be used to determine a regional contestants 1 ranking and consequently their winnings. Once determined, the API 4 may transfer the winnings to the player's bank account 5.

For a paid regional tournament or a paid global tournament, all contestants 1 or 3 pay an entry fee to enter a tournament. After paying the entry-fee, the contestants 1 or 3 are presented with an official server list in which those players play in order to qualify for the tournament and become eligible for rewards. The entry fees are used to establish a tournament pool in one exemplary embodiment. A percentage of the money from entry-fees may be collected and distributed from and to players. Once the tournament has expired, the contestants 1 or 3 may receive their winnings based on their statistical game performance. All funds may be distributed and contained within a player's bank account 5 until the contestants 1 or 3 submit a withdrawal request.

Figure 4:
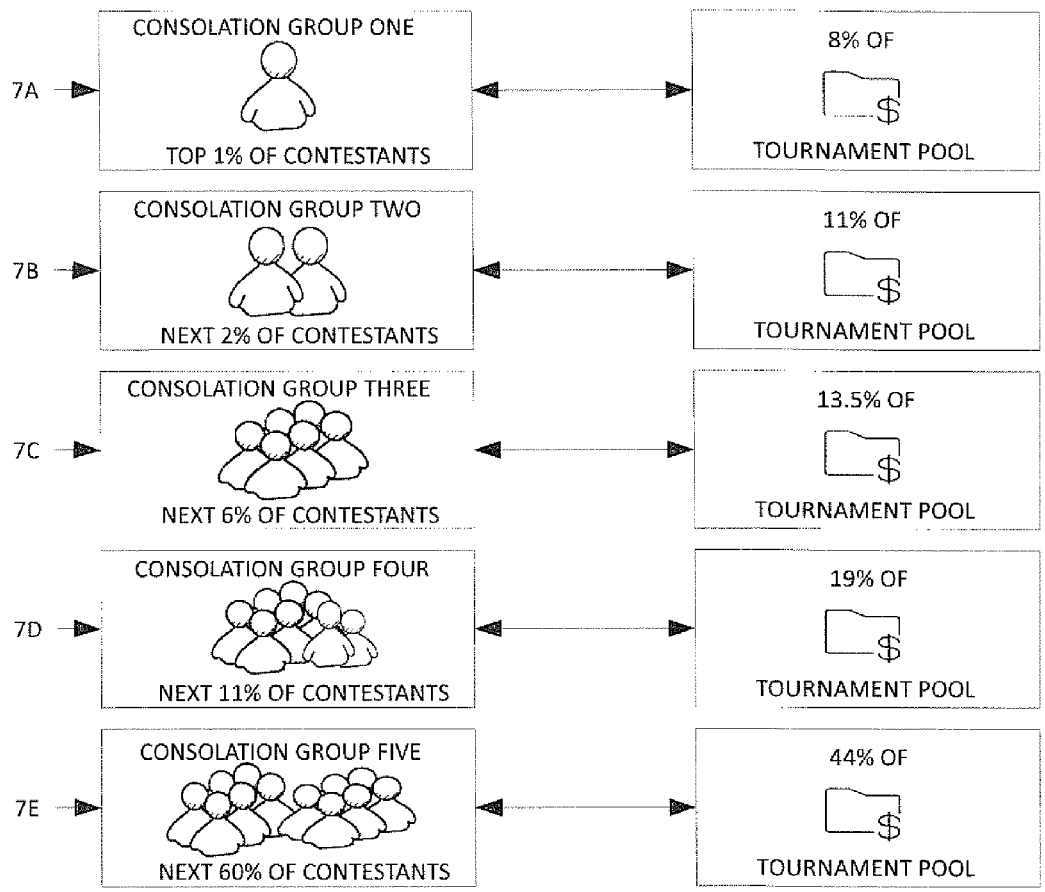
FIG. 4 shows an example of one embodiment of a pay table used in the system of the present invention.

Referring now to FIG. 4, description of one embodiment of a tournament pay table will be disclosed. In accordance with one embodiment, approximately sixty percent of all tournament players may receive winnings with an approximate eighty-five to ninety-five percent game return. There may be a range of consolation groups from one to one hundred that may be paid out. Each consolation group may be populated by a percentage of the winning players.

As may be seen in the embodiment shown in FIG. 4, Consolation Group One 7A may contain the top one percent of all paid contestants 1 or 3 participating in a tournament (i.e., paid regional tournament or a paid global tournament) and may split eight percent (8%) of the Tournament Pool; Consolation Group Two 7B may contain the next top two percent of all paid contestants 1 or 3 participating in the paid tournament (i.e., paid regional tournament or a paid global tournament) and may split eleven percent (11%) of the Tournament Pool; Consolation Group Three 7C may contain the next top six percent of all paid contestants 1 or 3 participating in the paid tournament (i.e., paid regional tournament or a paid global tournament) and may split thirteen and one-half percent (13.5%) of the Tournament Pool; Consolation Group Four 7D may contain the next top eleven percent of all paid contestants 1 or 3 participating in the paid tournament (i.e., paid regional tournament or a paid global tournament) and may split nineteen percent (19%) of the Tournament Pool; Consolation Group Five 7E may contain the next top forty percent of all paid contestants 1 or 3 participating in the paid tournament (i.e., paid regional tournament or a paid global tournament) and may split forty-four percent (44%) of the Tournament Pool. This embodiment is not meant to be limiting, it's merely descriptive of one embodiment. There could of course be more or less than five groups, different monetary percentages for each group and different percentages for the number of players being paid in each group without departing from the spirit and scope of the present invention.

The system 100 allows progressive jackpots. Progressive jackpots in the gambling industry are generally based on a predetermined winning combination(s) that is generally difficult to obtain and all having an element of chance. In video game tournaments, chance is not allowed or it may be considered to be gambling which is currently illegal in all jurisdictions in the United States and most Countries. These tournaments (i.e., paid regional tournament or a paid global tournament) are generally based entirely on skill based achievements. The progressive jackpots are also be based on skill based achievements or combinations of skill sets or sequential skills or skill sets. For example, being the first person to win a predetermined winning combination(s) of skill based achievements could be a first progressive jackpot based on non-gambling scenarios. The above is given as an example and should not be seen in a limiting manner.

Figure 5:
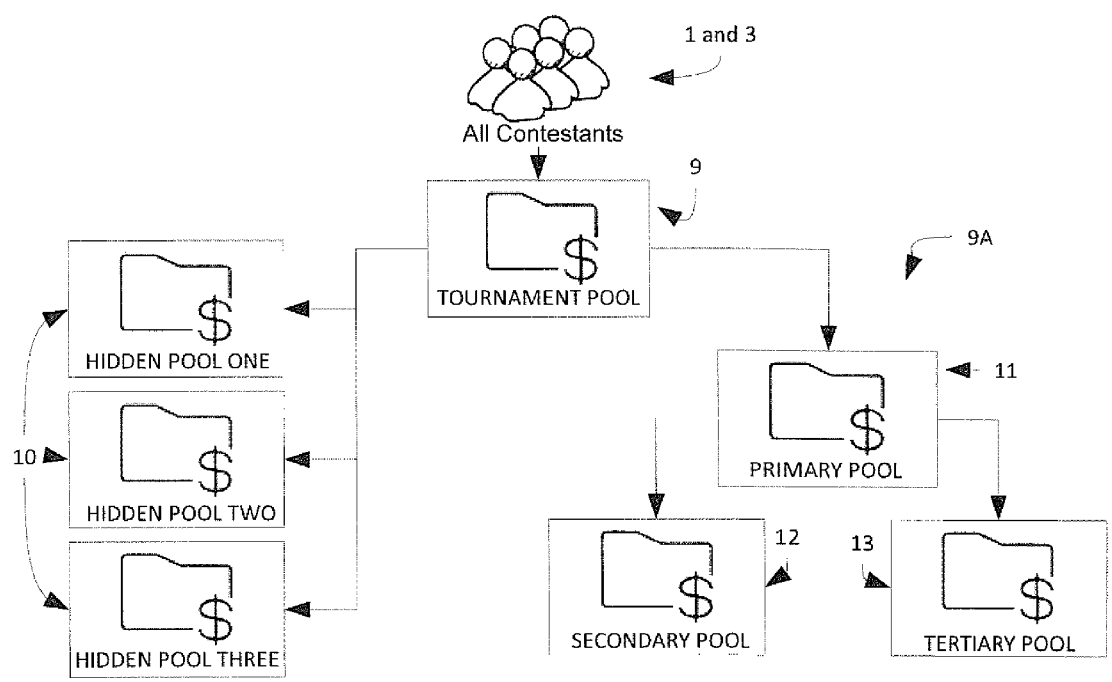
FIG. 5 shows an example of one embodiment of distribution of the tournament pool for the system of the present invention.

Referring now to FIG. 5, there is shown a block diagram schematic illustrating an exemplary embodiment of the tournament pool 9 distribution. In this embodiment, the contestants 1 or 3 in the paid regional tournament or a paid global tournament pay the entry fee to participate. The entry fee may be placed into a tournament pool 9. In this embodiment, a small percent of every tournament pool 9 is reserved and divided between a plurality of progressive tournament pools 9A. In the exemplary embodiment of FIG. 5, three progressive tournament pools 9A (Primary Pool 11, Secondary Pool 12 and Tertiary Pool 13) are visible and obtainable by tournament players and there are hidden tournament pools 10, which are created to replenish the Primary Pool 11 once it has been paid out or hit. A percentage of the Primary Pool 11 may be reserved for the Secondary Pool 12 and the Tertiary Pool 13. The above is only shown as an exemplary embodiment. There may be more or less Progressive Tournament pools 9A as well as different means for allocating distribution of the rewards without departing from the spirit and scope of the present invention.

It accordance with another embodiment of the present invention, the Secondary Pool 12 and Tertiary Pool 13 pools may have Hidden Pools 10.

Progressive tournament pools 9A may be won in different manners. For example, to win the Tertiary Pool 13, a paid player: Places third or better four times in the same game and tournament type. In accordance with one exemplary embodiment, the Secondary Pool 12 may be awarded after the Tertiary Pool 13 has been won. Once the Tertiary Pool 13 has been won, to win for the Secondary Pool 12, a paid player may have to: Place in second or better three times in the same game and tournament type. In accordance with one exemplary embodiment, once the Tertiary Pool 13 and Secondary Pool 12 have been won, to qualify for the Primary Pool 11 a contestant may have to: Place in first two times in the same type of tournament for the same game. The above are only given as examples and should not be seen in a limiting manner.

Figure 6:
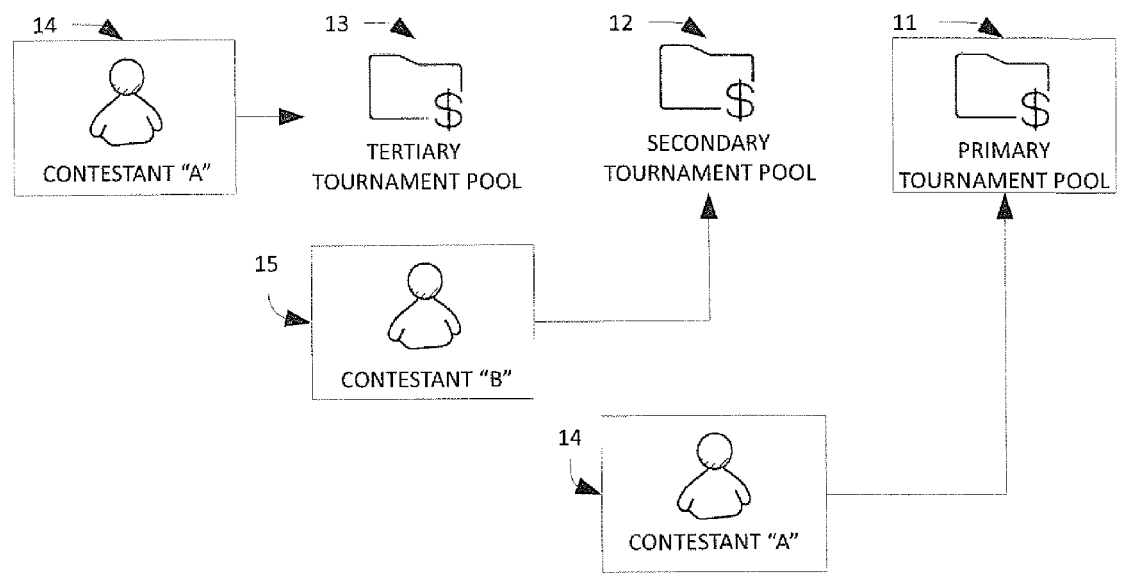
FIG. 6 shows an example of one embodiment of distribution of a progressive jackpot for the system of the present invention.
Figure 7:
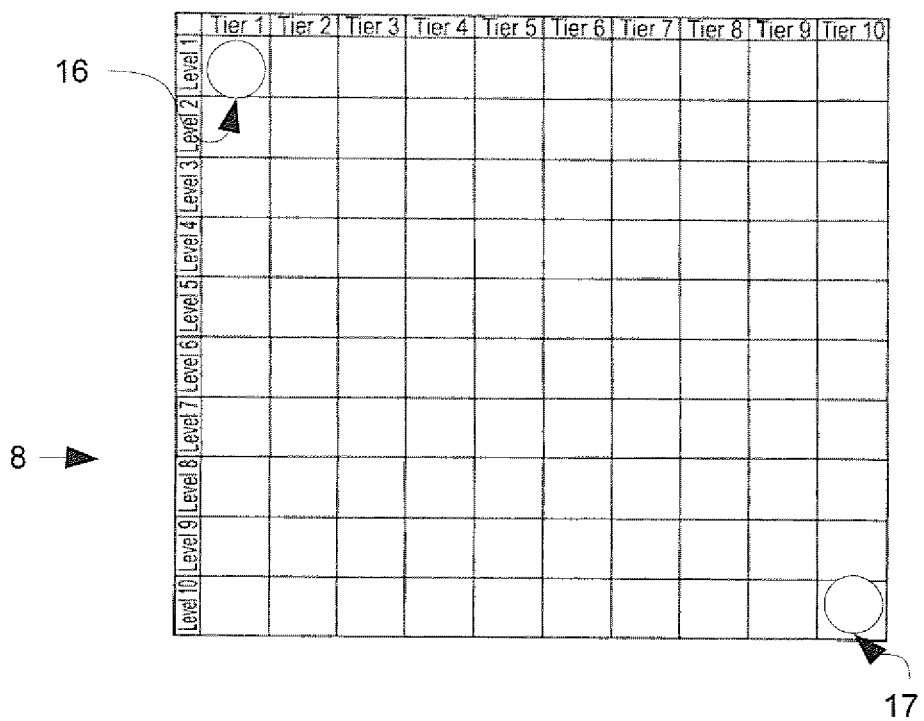
FIG. 7 shows an example of a player ranking grid used in the system of the present invention.
Figure 8:
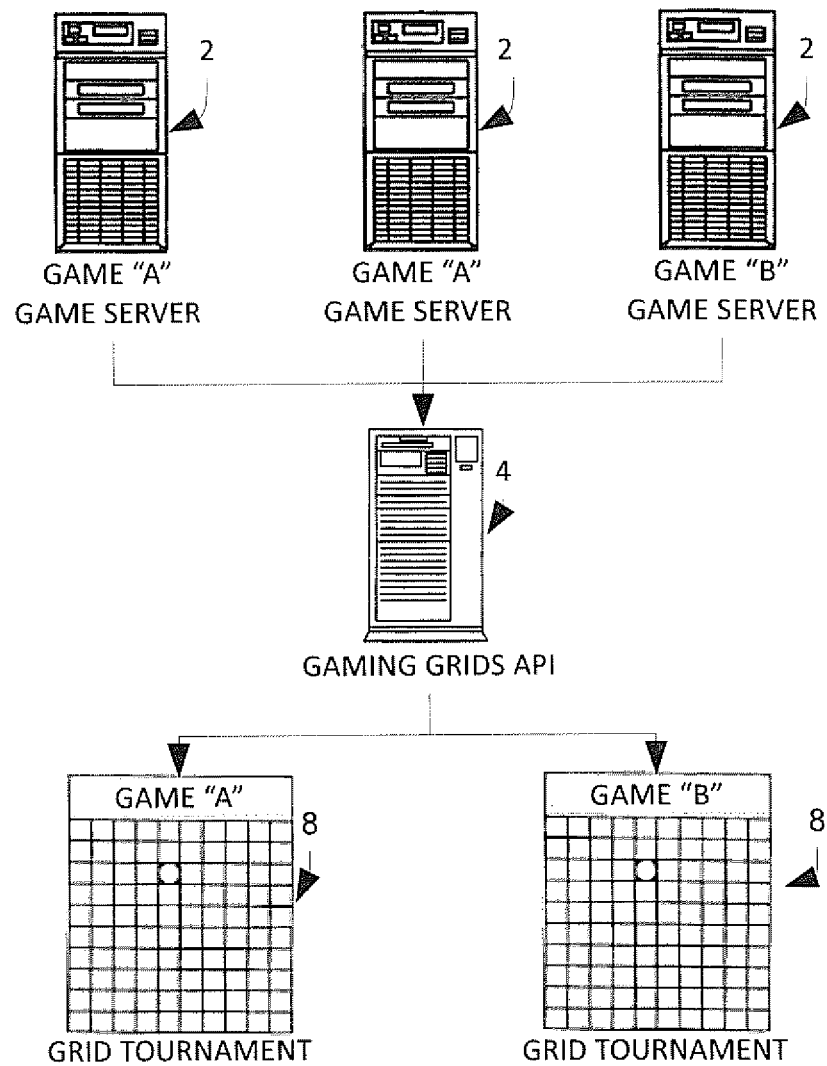
FIG. 8 shows an example of how the API of the present system generates a player ranking grid for different online gaming tournaments.

Referring to FIG. 6, there is shown an exemplary embodiment of the tournament pool distribution. In FIG. 6, a Contestant "A" 14 from one of the paid regional tournaments or paid global tournaments wins the Tertiary Pool 13. Then Contestant "B" 15 may win the Secondary Pool 12, only after the Tertiary Pool 13 has been hit. Then any contestant can win the Primary Pool 11, but only after the Tertiary Pool 13 and Secondary Pool 12 have been hit.

In the event that the Primary Pool 11 is won, Hidden Pools 10 are allocated. For example, Hidden Pool 1, in one exemplary embodiment, is allocated to the Primary Pool 11, Hidden Pool 2 is allocated to Hidden Pool 1 and Hidden Pool 3 is depleted to zero. This may be used to help prevent the Primary Pool 11 from starting at an insignificant dollar amount. This progressive embodiment is not meant to be limiting, it's merely descriptive of one exemplary embodiment. In-Game skills and skill sets could also be used in competing scenarios to form progressive jackpots.

In an exemplary embodiment of the system 100, the API 4 is stored on a server 4A within the system 100 in accordance with one or more exemplary embodiments of the present invention. The server 4A can take the form of a computer server, and more specifically a web server. The server 4A can include ROM, operating system and software instructions, RAM, central processor unit (CPU), network interface to connect the server storing the API 4 to the gaining servers 2 and a data storage device. A conventional personal computer or computer workstation with sufficient memory and processing capabilities can be used as the server 4A. Alternatively, multiple interconnected servers can also serve as the server.

Figure 9:
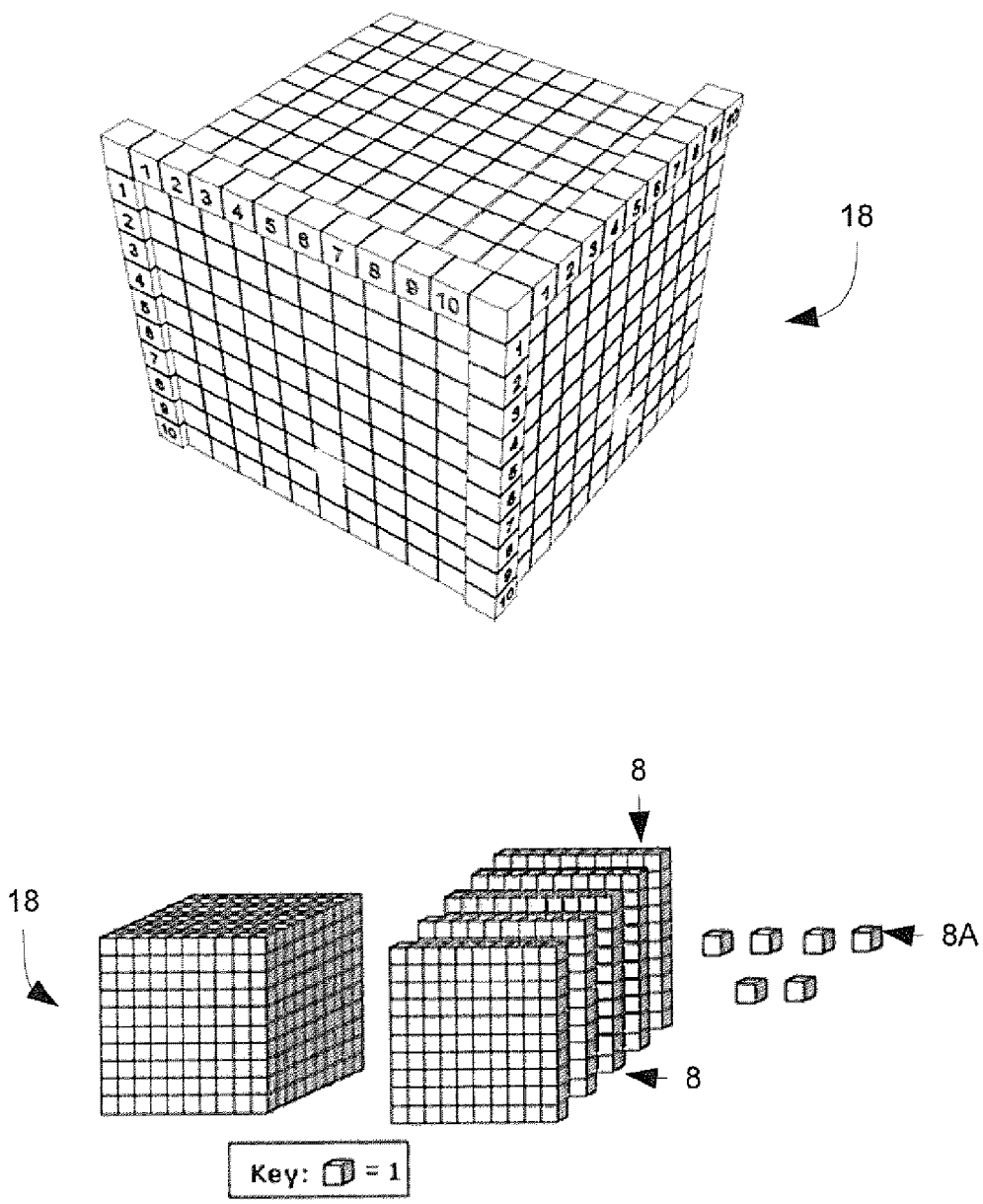
FIG. 9 shows one example of the make-up of a player ranking cube used in the system of the present invention.

In another exemplary embodiment using the cube 18 of FIG. 9, the API 4 factors into the ranking, the player's or team's performance in-game and skill ranking differential between the two players (or teams) in determining actual grid movement during and after a match and a player's or team's post-match ranking. Skill ranking and new skills are earned during a match and those skills are updated during the match and reflected in the cube 18. Post-match performance algorithms assign a percentage of the losing players skill ranking to the winning player; or declares an in-game performance score multiplier; which effectively transfers skill rating from a losing player to a winning player, or rewards a winning player with additional skill ranking/rating points based on an outcome with a higher-ranked player, in addition to any already calculated performance data from the match game statistics.

Referring now to FIGS. 7-10, there is illustrated an exemplary embodiment of the grid 8. In this embodiment, the API 4 generates a ranking grid 8. The grid 8 is a unique multi-level, multi-tier grid. In accordance with this embodiment, the grid 8 has 100 positions (10 levels with 10 tiers) player ranking grid per tournament, per game.

The grid 8 is used for rating and ranking players skill based on live and real-time or past performance within the given game and/or tournament; by means of skill rating algorithms and mathematics that are processed during and after each tournament match. The higher of a players skill, the higher they are visually seen, and programmatically ranked on the grid 8 (high being towards upper-left, L1T1—Level 1, Tier 1, 16 as may be seen in FIG. 7).

The grid 8 has the ability to function in a dynamic mode, enabling the Level 1, Tier 1 position to have a minimum numerical skill ranking equal to that of the highest ranked player; and then allow for an exponential decrease in minimum/maximums required per each level/tier combination until the bottom (level 10, tier 10, 17) is reached—which in most cases is at 0.

During a tournament, players may join via one of two methods; (1) manually by using a user interface of a website, mobile applications, or other deemed user interface applications, or (2) automatically by having enabled an Auto-Join Feature, which may intelligently join a user to a tournament based on defined and agreed upon criteria once the system detects that the player is playing in a sanctioned tournament server (location).

Players may play throughout the tournament within one or multiple Game Servers 2 (locations); from this point, the system 100 may "handshake" with the game server 2 and pull real-time or near real-time game play performance and commit to the grid 8 via use of the API 4; exposing public-facing methods to allow for on-demand grid calculation algorithmic processing for player performance data obtained within the aforementioned server(s) 2.

Once player performance data has been fed from the game server(s) 2 of the tournament(s), the API 4 processes gamer performance into numerical rating and ranking "scores" which are then plotted on the appropriate tournament grid(s) 8; from this point, once a tournament has expired or otherwise completed based on the allotted play-time, the system 100 calculates player positions, rewards, and progressive jackpot(s)/tournament pool(s) issuance based on the player rating/ranking as demonstrated per the placement on the actual tournament gaming "grid" 8. The grid 8 has the ultimate responsibility of determining player skill ranking within the game, and determining what player(s) get rewarded, as well as visually showing to players, users, and bystanders the progress and performance of players within.

The system 100 may operate a unique 100 position (10 levels with 10 tiers) player ranking grid 8 per tournament, per game. The grid 8 is responsible for rating and ranking players skill based on live and real-time or past performance within the given game and/or tournament; by means of unique skill rating algorithms and mathematics that are processed during and after each tournament match. The higher of a player skill, the higher they are visually seen, and programmatically ranked on the grid (high being towards upper-left, L1T1—Level 1, Tier 1, 16).

The grid 8 has the ability to function in a dynamic mode, enabling the Level 1, Tier 1 position 16 to have a minimum numerical skill ranking equal to that of the highest ranked player; and then allow for an exponential decrease in minimum/maximums required per each level/tier combination until the bottom (level 10, tier 10, 17) is reached—which in most cases is at 0.

Players may play throughout the tournament within one or multiple sanctioned Game Servers 2 (locations) i.e Game Server 2 running Game "A" or Game Server 2 running Game "B"; from this point, the system 100 may "handshake" with the game servers 2 and pull real-time or near real-time game play performance and commit to the grid 8 via use of the API 4; exposing public-facing methods to allow for on-demand grid calculation algorithmic processing for player performance data obtained within the aforementioned server(s) 2.

Once player performance data has been fed from the game server(s) 2 of the tournament(s), the system 100 processes gamer performance into numerical rating and ranking "scores" which may then be plotted on the appropriate tournament grid(s) 8 i.e Grid for Game "A" or Grid for Game "B"; from this point, once a tournament has expired or otherwise completed based on the allotted play-time, the system 100 may calculate player positions, rewards, and progressive jackpot(s)/tournament pool(s) issuance based on the player rating/ranking as demonstrated per the placement on the actual tournament gaming grid 8. The grid 8 has the ultimate responsibility of determining player skill ranking within the game, and determining what player(s) get rewarded, as well as visually showing to players, users, and bystanders the progress and performance of players within.

The system 100 may be expanded to so that the grid technology can incorporate millions of players that will be playing from around the world. The grids 8 may be configured into a 3-Dimensional Cube 18 as shown in FIG. 9, which can have a multitude of functions. i.e. player ratings, types of games, amounts of the various progressive prizes or any other functions of the games that need and/or players want displaying. In addition to ranking players, a portion of the 3-Dimensional Cube 18, may, in an exemplary embodiment, be dedicated to ranking the game itself, comparing the instant game to other games on the 3-Dimensional Cube 18. Since the 3-Dimensional Cube 18 is capable of serving many games, the various games may be compared to one another and ranked against one another.

As illustrated in exemplary embodiment of the 3-Dimensional Cube 18 of FIG. 9, the cube 18 includes a plurality of stacked grids 8. The stacked grids 8 having a plurality of levels and each level having a plurality of tiers 8A

In the exemplary embodiment of the 3-Dimensional Cube 18 in FIG. 9, the cube 18 gives the tournament the functionality and the flexibility to allow players of multiple level skills to compete against one another on a generally level playing field. As a player progresses through the game's skill levels and acquires new skills, the player receives increasingly greater challenges. However, as a result of using the ranking functionality of the 3-Dimensional Cube 18, players mostly compete against players of equal or lesser skill levels, for example, within 5 to 10 level range based on Cube schema 1 or Cube schema 2.

Cube Schema 1, Functional Description

With particular reference to FIG. 9, there is illustrated an exemplary embodiment of the 3-dimensional cube 18. In the embodiment illustrated, the 3-dimensional cube 18 includes a plurality of stacked grid levels resulting in a minimum and maximum of 10 levels of difference in the player skill during play on that level of the cube section. As the player progresses to the next cube level, 10 in-game experience levels are earned prior to attaining the next cube level. This repeats itself until a player goes as far as possible based upon the player's skill level.

Cube Schema 2 Functional Explanation—

Interlaced and offset cube level layers (FIG. 10) produce a fixed effect for the player as the player enters the next cube level at the middle of the skill levels thus having a + or − 5 level difference in actual skill as the player proceeds through the cube levels. The same format pertains to this cube level as in Schema 2. As the player progresses to the next cube level, 10 in-game experience levels are earned. These levels must be earned prior to attaining the next cube level. This repeats itself until a player goes as far as possible based upon the player's skill level.

Referring now to FIGS. 11-14, another embodiment of the online-gaining tournament system 100 of the present invention is shown. In this embodiment, the system 100 is a adapted to allow garners who are proficient in multiple video games to compete against each other to determine a contestant's 1, 3 (or group of contestants 1, 3 or team of contestants' 1, 3) overall performance across all of the games so that an overall performance metric may be used in an a large-scale fantasy game. In this embodiment, the system 100 has the overall ability to take into consideration any single statistical metric or any combination of statistical metrics representing a contestant's 1, 3, or a group of contestants' 1, 3 or team of contestants' 1, 3, performance-in-time with the expectation of affecting a unilateral compiled summation of performance metrics representative of the overall performance of the associated contestant 1, 3 or group of contestants 1, 3 or team of contestants' 1, 3 for consideration and utilization in fantasy sports and e-sports. In other words, in this embodiment, the system 100 may take multiple statistics and metrics of various games such as Counter-Strike, Battlefield, Defense of the Ancients, League of Legends and Team Fortress for a contestant 1, 3, or group of contestants 1, 3 and process them so that it is able to produce a metric/statistic that represents that contestant's 1, 3 or group's overall performance across all games so that the new overall performance metric can be used in a large-scale fantasy game. In this embodiment, the API 4 that is stored on the server 4A is a two-way (or bidirectional) API 4, which may also be referred to hereinafter as an Automatic Duplex Synchronized and Metrics Interface (ADSSMI) 4B. In this embodiment, it should be understood that all of the aspects of the system 100 discussed above (e.g. the dynamic participant ranking grid, skill ranking differential, virtual participant bank accounts, etc.) may be adapted for whether the participant is an individual participant (or contestant 1, 3); a group of participants (or contestants 1, 3); or a team of participants (or contestants 1, 3), as appropriate.

Figure 11:
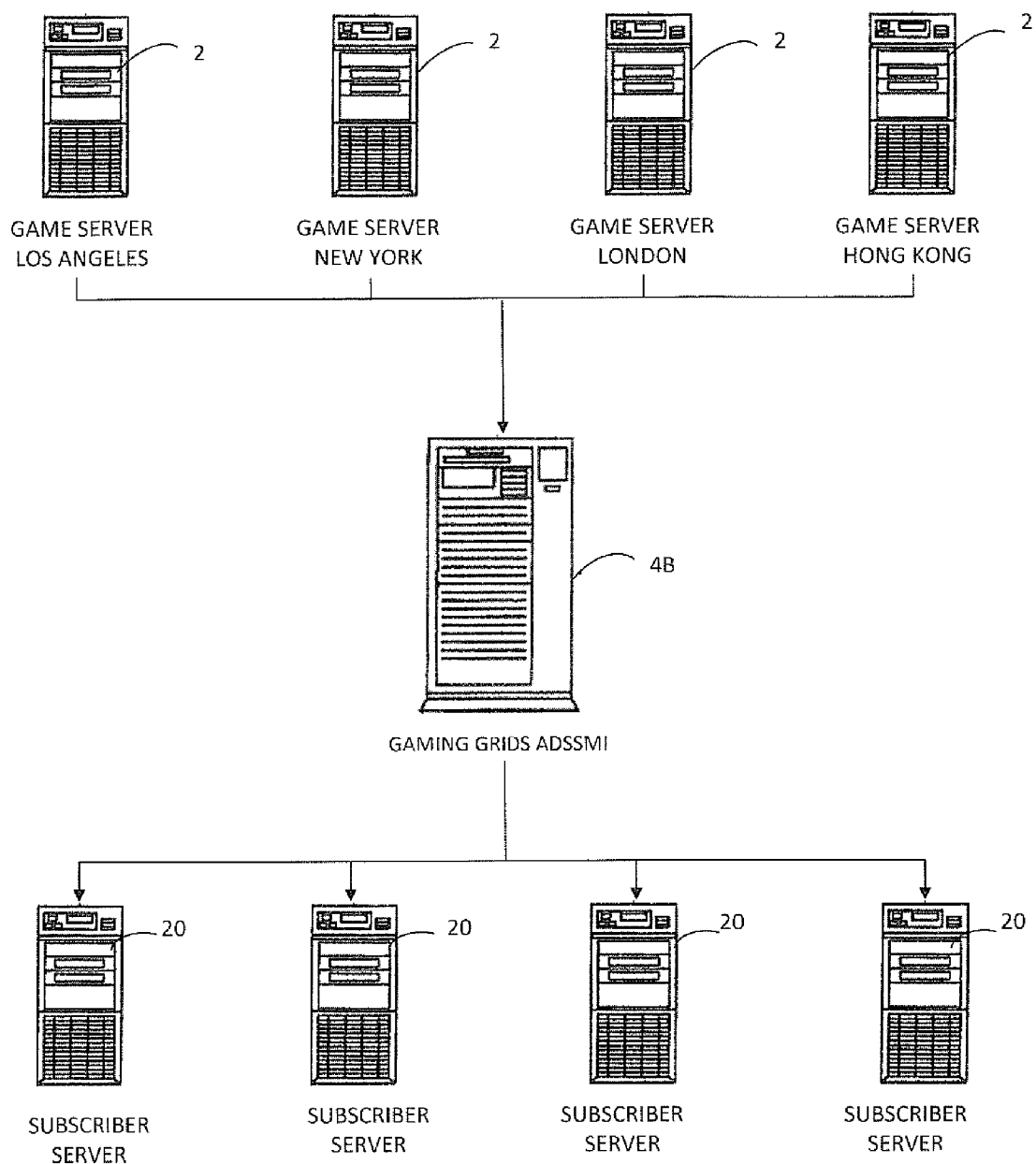
FIG. 11 is a simple block diagram of another embodiment of the system of the present invention.

Referring to FIG. 11, the gaining servers 2 are coupled to one or more ADSSMI(s) 4B. The ADSSMI 4B receives raw statistical, event, telemetry, and contestant 1, 3 performance data in real-time or pseudo-real-time from one or more applicable electronic video game servers 2 with the intention of utilizing the data for statistical calculation and fantasy e-sports purposes. The ADSSMI 4B also provides an extensibility factor allowing for the processing of the data structures to represent a unified contestant 1, 3 or group rating across multiple video games. The ADSSMI 4B is also coupled to one or more third-party subscriber servers 20 so that the ADSSMI 4B may provide an automated two-way communication layer to further disseminate raw statistical data and processed unified rating data to third-party subscribers 22.

In this embodiment, the raw statistical data received by the ADSSMI 4B from each video game being played on the electronic video game servers 2 may be used for multiple purposes. The raw aggregated performance statistical data for a specific video game may be displayed on a contestant 1, 3 or team website, dynamic signature image, or other online media. The computed statistical data (i.e. the compiled summation of performance score) encompassing all games for a specific contestant 1, 3 or team may also be displayed on a website, dynamic signature image, or other online media. The raw statistical data and event information for each specific game, the raw aggregated data of all of the games being played, and/or the calculated compiled summation of performance scores over all of the games being played, may be used to determine placement and/or seeding of the contestant 1, 3 or team in a gameplay event, such as a tournament, league, or season. The raw aggregated data and/or the compiled summation of performance scores, whether for a specific game or group of games, may also be used for the purpose of creating a real-time or pseudo-real-time fantasy e-sports game. The accumulated statistical data for a specific game may be used to determine a single top contestant 1, 3 or single top team or may be used to determine a list of top contestants 1, 3 and/or top teams throughout a certain time period; such as determining the overall "Player of the year," "Team of the Year," "Game of the Year," etc.

In this embodiment, the raw aggregated performance statistical data may also be utilized to create, form, and facilitate a competition amongst various games, utilizing the same teams and/or contestants 1, 3 to create a multi-game gaining competition, whereby teams/contestants 1, 3 must compete in various applicable games to constitute a win or progress. For example a "triathlon" gaming competition would require the teams/contestants 1, 3 to compete in three applicable games to constitute a win or progress. It should be clearly understood that substantial benefit may be derived from any number of games in a multi-game gaming competition; e.g. two, five, etc.

The raw aggregated statistical data may also be used for contestants 1, 3 and/or teams to create analytics reporting for a specific game or group of games, and/or team(s), and/or contestant(s) 1, 3 through a time period for the purpose of evaluating gameplay performance, activity, or economic studies as they relate to e-sports. Any portion of the raw aggregated or real-time statistical data, event data, or any information transmitted to the ADSSMI 4B may be used for the purposes of displaying on, within, or in-conjunction with live or recorded video broadcasting media, such as in-game video streaming of gameplay, third-party coverage and streaming of tournament event, and match gameplay, broadcasting of summarized coverage regarding or relating to an e-sports event. The raw game-specific data, the raw aggregated data over multiple video games, and/or the compiled summation of performance scores over all of the video games for the contestant(s) 1, 3 may be used or disseminated for the purpose and intent of conducting research of past or present performance as it relates to a specific game, or group of games over a time period, where the intent is to facilitate a recruitment system utilized by groups or teams to evaluate, locate, and procure contestants 1, 3 and/or team members. Any portion of the raw aggregated data, real-time statistical data, event data, or any information transmitted to the ADSSMI 4B may be used to disseminate raw game-specific data information, raw aggregated data, and/or compiled summation of performance scores via automated voice delivery systems, such as an automated telephone answering system, or ringdown call system, or public service announcement delivery system, or automated text-to-speech system.

Figure 12:
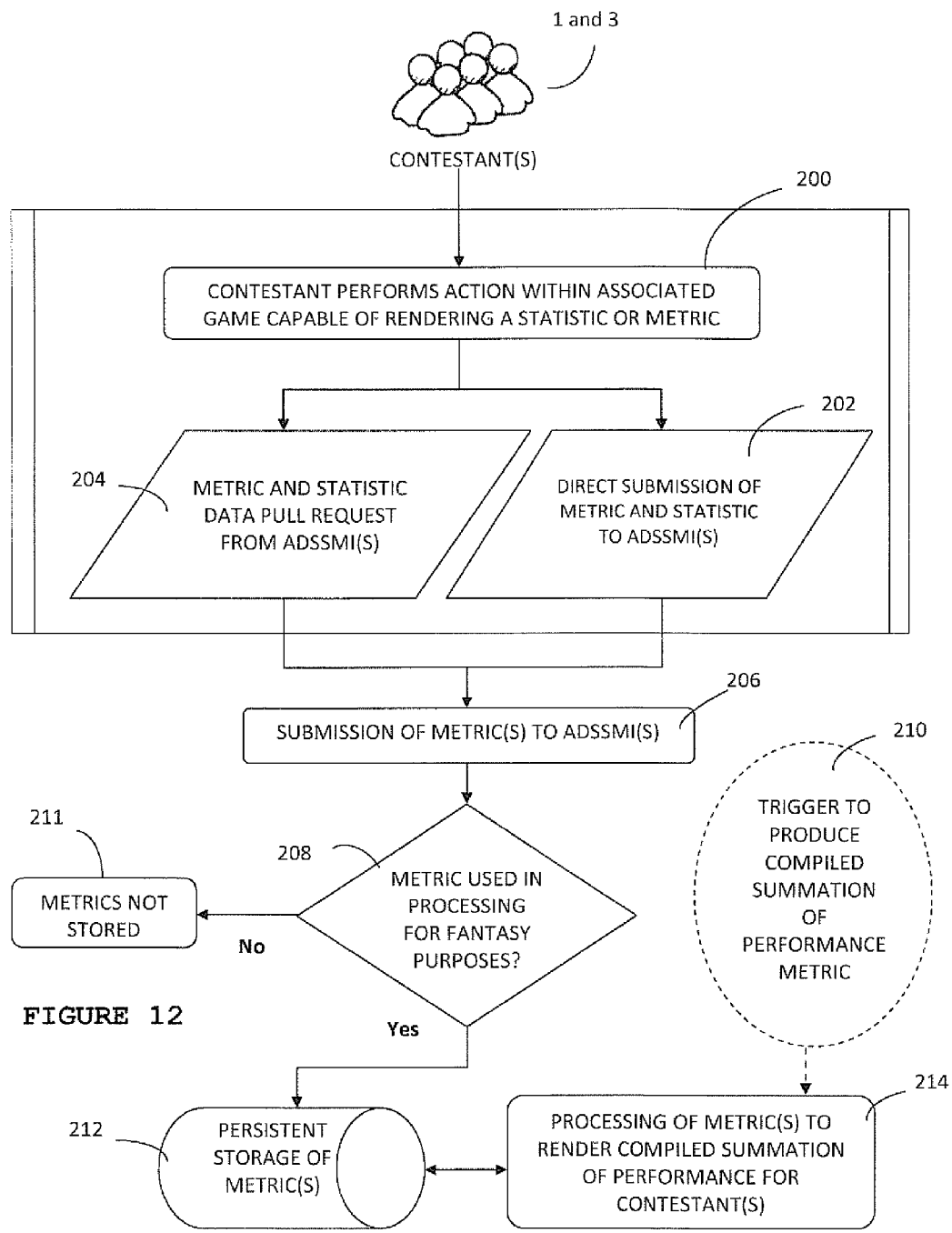
FIG. 12 shows a simple flow diagram of the system of FIG. 11 showing how player performance metrics are rendered and made available to one or more subscribing third-party entities.

FIG. 12 shows the processing and calculation required to render the contestant(s) 1, 3 compiled summation of performance metric(s). The compiled summation of performance score for a contestant 1, 3 is derived and rendered purely based on a proprietary internal mathematical algorithm that formulates a level and normalized metric per each unique characteristic and captured metric for each unique online video game being taken into consideration. This process is accomplished by means of assigning a determined weighted calculation on each item within the raw aggregated data before processing a final normalization and concatenation algorithm. This is necessary because one video game may have a lower level of difficulty that another video game being played; e.g. a kill may be harder to achieve in one video game than it is in another. In the context above, the compiled summation of performance score is a rendered metric or item that can only be created by performing a set or multiple sets of mathematical algorithms based on raw aggregated metrics and data from the video game servers 2. Furthermore, the raw aggregated metrics and data are the raw resources, metrics, and items sent as events from the video game servers 2, which may independently be used in some form of singular-based video game metrics or for fantasy game point designation. The raw aggregated metrics and data are also heavily relied upon in the execution of the compiled summation of performance score processing.

From a strictly statistical perspective, the following shall always be true in this embodiment: a contestant 1, 3, group of contestants 1, 3, and/or team of contestants 1, 3 holds the capability and/or desire to participate in gameplay that is capable of being utilized in the processing of a statistical metric; a metric shall consist of any event or combination of events within an associated game capable of being represented in numerical form (e.g. number of kills, number of deaths, etc.); and the ADSSMI 4B is the processing platform that identifies and represents the central or spanned processing engine and/or agents running compiled binary system(s) capable of, and/or designed having sub-systems with intentions of receiving and/or processing the aforementioned metrics. The ADSSMI 4B runs in a manner to connect with game servers 2 over the internet or intranet.

During the course of the contestant(s) 1, 3 actively participating in gameplay (as defined by the associated game; being that of the actions required to generate metric-capable events such as, but not limited to, the act of destroying an objective within such games where the capability exists), raw metric(s) and/or telemetry (shown in step 200) data shall be transmitted to the ADSSMI 4B or a designated agent and/or repository utilizing one of the following methods; direct submission to the defined ADSSMI 4B via internal invocation of associated methods whereby the ADSSMI 4B is the recipient (or intended recipient by means of a relay) and the target, but is not the initiator (see step 202); or submission to the defined ADSSMI 4B via transmission where the ADSSMI 4B is the initiator, whereby metrics are transmitted as a response to a pull from the ADSSMI(s) 4B (see step 204). In other words, as the contestant(s) 1, 3 is playing a game in a game server 2, the actions of the contestant 1, 3 will be transmitted to the ADSSMI 4B (or any systems that communicate directly with the ADSSMI 4B) by one of the following methods: directly sending the contestant 1, 3 information, including the event (e.g. kill, death, etc.) to the ADSSMI 4B in real-time; or responding to a request for raw statistical information from the ADSSMI 4B.

At step 206, during the transaction/transmission of data from the game server 2 or agent to the ADSSMI 4B, Transmission Control Protocol (TCP) packets consisting of serialized and encoded entity statistics and event data are sent utilizing any W3C standard and/or The Internet Engineering Task Force (IETF®) RFC conforming to web service and data operations, such as application/xml, application/text-xml or application/json (RFC 4627).

Once the transmitted raw data is successfully at the ADSSMI 4b, at step 208, logic will determine whether or not the raw aggregated event/data is applicable to fantasy applications, to which it will then be further transmitted for storage, in either a persistent data storage layer or a non-persistent volatile data storage layer, on the server 4A. A logic, as used herein, is a lookup and comparison of data types and metrics sent in the transaction, ensuring that they are properly marked and identified as a metric that is used in a calculation or for raw display for the fantasy and statistics applications. If the raw event data is not used for fantasy or for statistics operations, then it will be selectively omitted and it will not be stored on the server 4A (see step 211). Examples of raw event data that would not be used for fantasy or for statistics operations may include items such as player physical real-time location, direction of camera and angle, and other game-specific items. Further logic to refine the location and capacity of storage based on the outcome of the metric being applicable for fantasy gameplay is possible, however not required (retention of all statistics, data, and metrics could be allowed).

At step 210, the ADSSMI(s) 4B will, at a defined trigger (i.e. a defined amount of time, such as a timer occurring at set intervals [e.g. every 30 minutes], at random, or at the direct trigger of data being received or processed/manipulated), perform a set of computational and mathematical operations to/with available metric(s) that will render the compiled summation of performance metric (see step 214) for a single contestant 1, 3, or group of contestants 1, 3 or team or contestants 1, 3 whereby the metric(s) of one or more associated and applicable games are processed to create an overall performance metric (or group thereof) to effectively represent the performance of the contestant(s) 1, 3 as a whole, as opposed to a singular representation of performance within only a single game. In other words, the ADSSMI 4B will then begin a calculation that takes into account all of the raw aggregated statistics and metrics reported for a contestant 1, 3, group of contestants 1, 3, or team of contestants 1, 3 across all games to produce a new overall performance metric. It should also be clearly understood that the calculation of the overall performance metric may occur automatically; i.e. without the occurrence of a trigger event.

Figure 13:
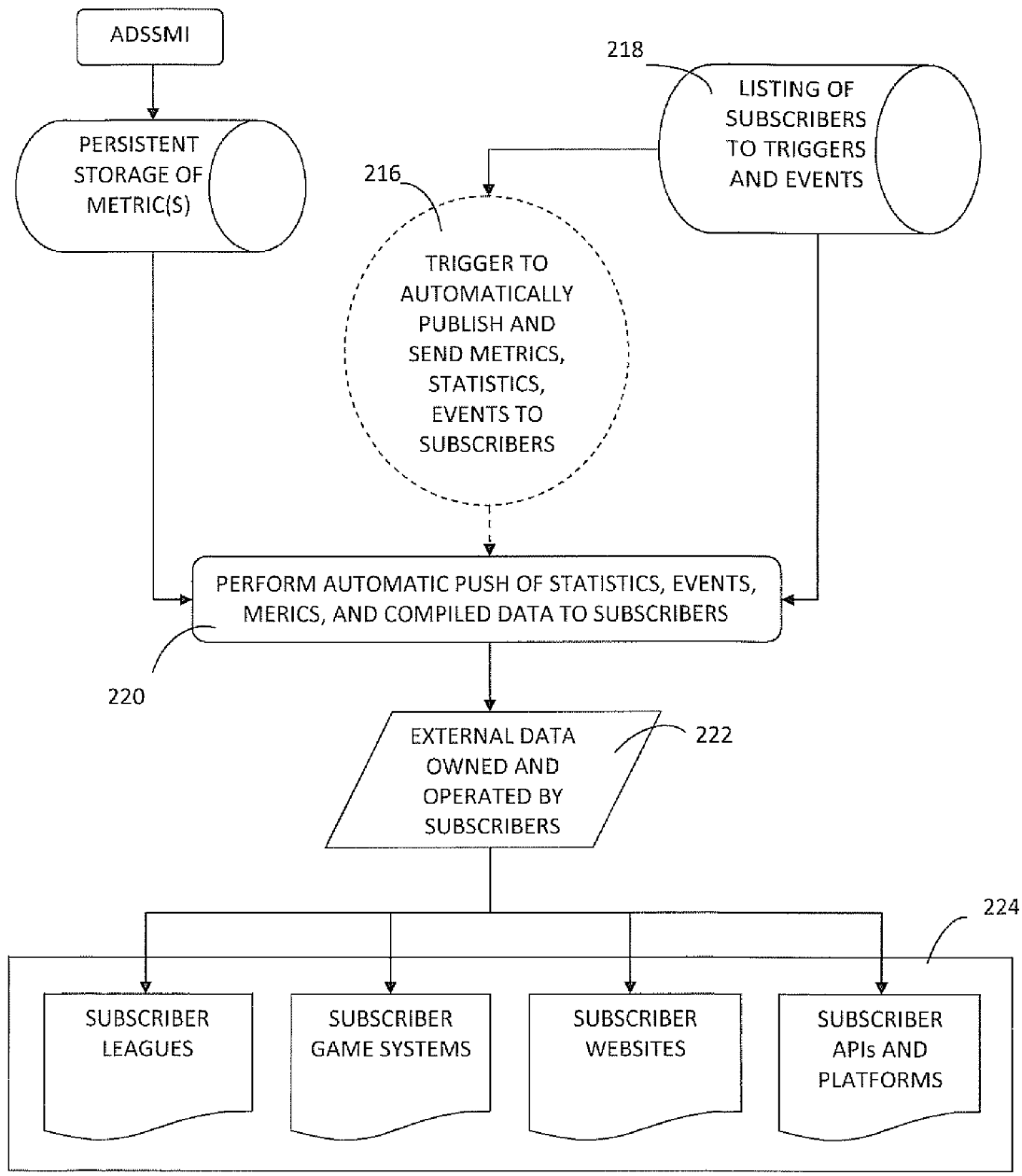
FIG. 13 shows an example of one embodiment of how the ADSSMI of the system of FIG. 11 may distribute player performance metrics to one or more subscribing third-party entities.

FIG. 13 shows the subscription and automatic pushing of real-time statistics, metrics, and compiled performance data to third-party subscribers 22. The ADSSMI 4B incorporates a method for providing notification queue capabilities with the extensibility of two-way-communication allowing for third-party subscriptions to trigger events, such that when raw metrics, statistics, or proprietary calculations render a processed overall summation of performance metric, all or a subset of information may be automatically electronically transmitted to subscribing or interconnected third-party systems, agents, and platforms; making possible an automatically synchronized and distributed all-encompassing statistics platform. In other words, the ADSSMI 4B may be designed in a manner so that contestant 1, 3 and group statistics and metrics can be pushed to the ADSSMI 4B by the game server 2, or pulled from the game servers 2 by the ADSSMI 4B, but can also automatically be distributed to other third-party users, systems, leagues, and platforms via directly pushing information, or by the third-party users pulling information based on a notification that is sent by the ADSSMI 4B.

Storage of third-party subscribers 22 may consist of a reference to the subscribing third-party entity 22 (be it a league, third-party website, game, developer, or any other entity), as well as a logic or algorithm specific to the posting of data, statistics, metrics, and events to that third-party subscriber 22 (see step 218).

Third-party subscriber 22 subscription management shall consist of the ability to automatically receive information(s) as it pertains to the following items based on a trigger (see step 216), which may be individually controlled and maintained by the third-party subscription service (whether the third-party subscriber 22 elects to receive all events in real-time, or a subset of information in delayed intervals): in-game event data; metrics and statistics computation triggers; overall performance calculation triggers; specific events and or metrics (such as a kill), and specific events and data for a certain game.

At step 220, when a trigger event is captured (at step 216), the platform will conduct a logic load and review to determine the exact data being requested or that is needed to be sent to the third-party subscriber/endpoint 22 (e.g. subscriber league, subscriber game system, subscriber website, subscriber API and platform, etc.).

At step 222, the data being transmitted over TCP socket connections to a third-party subscriber/endpoint 22 can be serialized and encoded utilizing any W3C standard and/or The Internet Engineering Task Force (IETF®) RFC conforming to web service and data operations, such as application/xml, application/text-xml or application/json (RFC 4627).

The point when data successfully reaches the third-party referenced subscriber/endpoint 22 (see step 222), the logic to transform, manipulate, and otherwise further distribute and display the data as intended on leagues, game systems, websites, and any other third-party platform is at the discretion of the third-party subscriber 22 (see step 224).

Figure 14:
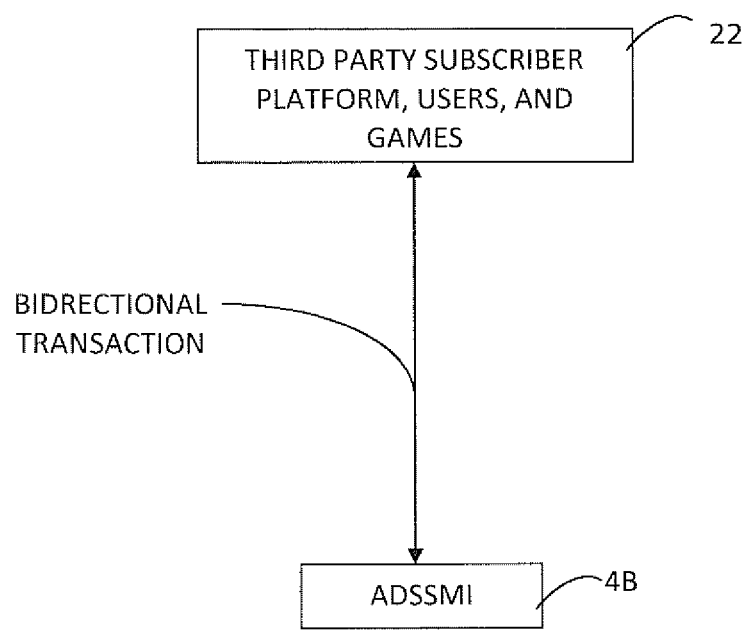
FIG. 14 shows an example of another embodiment wherein there may be bidirectional communication between the ADSSMI and a third-party subscriber.

Referring to FIG. 14, another embodiment of the system 100 is shown, wherein there may be two-way/bidirectional communication between the ADSSMI 4B and each third-party subscriber 22. In this embodiment, the system 100 will allow a bidirectional transaction with the ADSSSMI 4B to occur from, to, and with the third-party subscribers 22 in a manner such that an individual third-party subscriber 22 is able to host, maintain, and fully control their games, their users, their statistics, and fantasy leagues while also being able to send certain components of raw performance data as a transaction to the ADSSMI 4B in order to receive an aggregated performance statistic or metric. The aggregated performance statistic or metric may be calculated based on that individual third-party subscriber's 22 raw performance data and transmitted back to that individual third-party subscriber server 20 so that it can be further used in statistics and fantasy league play owned by that individual third-party subscriber 22. Alternatively, the aggregated performance statistic or metric may include that individual third-party subscriber's own raw performance data (which has been compiled into an aggregated performance statistic or metric) as well aggregated performance statistics or metrics from other third-party subscribers' 22 fantasy leagues, which can all then be further used in statistics and fantasy league play owned by the individual third-party subscriber 22.

What is claimed is:

1. A video gaming system having a plurality of video gaming servers for hosting online video gaming tournaments and a plurality of third-party subscriber servers for hosting at least one fantasy game, the system comprising:
   a statistical server having a bidirectional application programming interface, the bidirectional application programming interface configured to:
      receive raw performance data relating to each of two or more video games being played on the video gaming servers;
      determine whether the raw performance data relating to each of the two or more video games being played is relevant to the at least one fantasy game;
      aggregate the raw performance data that is determined to be relevant to the at least one fantasy game;
      assign a determined weighted calculation on each item within the raw aggregated performance data in order to accommodate for a varying degree of difficulty among the two or more video games being played;
      store the raw aggregated performance data on the statistical server;
      calculate compiled summation of performance scores over all of the video games being played on the video gaming servers based on the raw aggregated performance data stored on the statistical server, wherein the compiled summation of performance scores formulate a level metric for each item within the raw aggregated performance data; and
      transmit at least one of the raw aggregated performance data and the compiled summation of performance scores to the third-party subscriber servers;
   the statistical server being coupled to the plurality of video gaming servers, being coupled to the third-party subscriber servers, and having a processor for executing program instructions and a memory coupled to the processor for storing the program instructions, the programming instructions comprising:
      establishing at least one online video gaming tournament;
      accepting by the statistical server entry of a plurality of participants into the at least one online video gaming tournament; and
      establishing by the bidirectional application programming interface a dynamic participant ranking grid, the dynamic participant ranking grid updating based on performance of each participant of the plurality of participants in-game, wherein a position of individual participants of the plurality of participants on the dynamic participant ranking grid moves during and after the online video gaming tournament.

2. The video gaming tournament system of claim 1 wherein a participant may comprise one of: an individual participant, a group of participants, and a team of participants.

3. The video gaming system of claim 1, wherein the bidirectional application programming interface receives raw performance data relating to each of the two or more video games being played on the video gaming servers automatically.

4. The video gaming system of claim 1, wherein the bidirectional application programming interface receives raw performance data relating to each of the two or more video games being played on the video gaming servers in response to a request sent by the bidirectional application programming interface to the video gaming servers.

5. The video gaming system of claim 1, wherein the bidirectional application programming interface calculates the compiled summation of performance scores over all of the video games being played in response to a trigger event.

6. The video gaming system of claim 5, wherein the trigger event is initiated by a third-party subscriber.

7. The video gaming system of claim 5 wherein the bidirectional application programming interface is further configured to send a notification to the third-party subscribers that raw aggregated performance data is available and that the third-party subscriber may initiate the trigger event.

8. The video gaming system of claim 1, wherein at least one of the raw aggregated performance data and the compiled summation of performance scores are sent from the bidirectional application programming interface to the third-party subscriber servers automatically.

9. The video gaming system of claim 1 wherein the bidirectional application programming interface is further configured to:
receive raw performance data from at least one of the plurality of third-party subscribers relating to at least one game being played on at least one of the plurality of third-party subscriber servers;
determine whether the raw performance data relating to the at least one game being played on at least one of the plurality of third-party subscriber servers is relevant to the at least one fantasy game;
calculate compiled summation of performance scores based on the raw performance data relating to the at least one game being played on at least one of the plurality of third-party subscriber servers; and
transmit the compiled summation of performance scores to the plurality of third-party subscriber servers.

10. The video gaming system of claim 1, wherein the raw performance data and the compiled summation of performance scores transmitted by the bidirectional application programming interface to the third-party subscriber is used by the third-party subscribers for at least one of:
at least one fantasy game hosted by a third-party subscriber;
display of the aggregated performance statistics on a third-party subscriber website; and
seeding of a participant in a gameplay event hosted by a third-party subscriber.

11. The video gaming system of claim 1, wherein the dynamic participant ranking grid is a multi-level, multi-tier dynamic participant ranking grid.

12. The video gaming system of claim 1, wherein overall performance of the participant in-game and skill ranking differential between at least two participants determine movement on the dynamic participant ranking grid.

13. The video gaming system of claim 1, wherein the dynamic participant ranking grid defines a 3-dimensional cube.

14. A fantasy video gaming system having a plurality of video gaming servers for hosting online video gaming tournaments and a plurality of third-party subscriber servers for hosting at least one fantasy game, the system comprising:
a statistical server having a bidirectional application programming interface, the bidirectional application programming interface configured to:
receive raw performance data relating to at least one video game being played on the video gaming servers;
determine whether the raw performance data relating to the at least one video game being played is relevant to the at least one fantasy game;
aggregate the raw performance data that is determined to be relevant to the at least one fantasy game;
assign a determined weighted calculation on each item within the raw aggregated performance data in order to accommodate for a varying degree of difficulty among the two or more video games being played;
calculate compiled summation of performance scores over the at least one video game being played on the video gaming servers based on the raw aggregated performance data wherein the compiled summation of performance scores formulate a level metric for each item within the raw aggregated performance data; and
transmit at least one of the raw aggregated performance data and the compiled summation of performance scores to the third-party subscriber servers for use in the at least one fantasy game;
the statistical server being coupled to the plurality of video gaming servers, being coupled to the third-party subscriber servers, and having a processor for executing program instructions and a memory coupled to the processor for storing the program instructions, the programming instructions comprising:
establishing at least one online video gaming tournament;
accepting by the statistical server entry of a plurality of participants into the at least one online video gaming tournament; and
establishing by the bidirectional application programming interface a dynamic participant ranking grid, the dynamic participant ranking grid updating based on performance of each participant of the plurality of participants in-game, wherein a position of individual participants of the plurality of participants on the dynamic participant ranking grid moves during and after the online video gaming tournament.

15. The fantasy video gaming system of claim 14, wherein the dynamic participant ranking grid is a multi-level, multi-tier dynamic participant ranking grid.

16. The fantasy video gaming system of claim 14, wherein overall performance of the participant in-game and skill ranking differential between at least two participants determine movement on the dynamic participant ranking grid.

17. The fantasy video gaming system of claim 14, wherein the dynamic participant ranking grid defines a 3-dimensional cube.

18. The fantasy video gaming system of claim 14, wherein the bidirectional application programming interface is configured to:
receive raw performance data relating to each of two or more games being played on the video gaming servers;

determine whether the raw performance data relating to each of the two or more games being played is relevant to the at least one fantasy game;

aggregate the raw performance data that is determined to be relevant to the at least one fantasy game;

calculate compiled summation of performance scores over all of the two or more video games being played on the video gaming servers based on the raw aggregated performance data; and transmit at least one of the raw aggregated performance data and the compiled summation of performance scores to the third-party subscriber servers for use in the at least one fantasy game.

19. The fantasy video gaming system of claim 14 wherein a participant may comprise one of: an individual participant, a group of participants, and a team of participants.

20. The fantasy video gaming system of claim 14, wherein the bidirectional application programming interface receives raw performance data relating to the at least one video game being played on the video gaming servers automatically.

21. The fantasy video gaming system of claim 14, wherein the bidirectional application programming interface receives raw performance data relating to the at least one video game being played on the video gaming servers in response to a request sent by the bidirectional application programming interface to the video gaming servers.

22. The fantasy video gaming system of claim 14, wherein the bidirectional application programming interface calculates the compiled summation of performance scores over the at least one video game being played in response to a trigger event.

23. The fantasy video gaming system of claim 22, wherein the trigger event is initiated by a third-party subscriber.

24. The fantasy video gaming system of claim 22 wherein the bidirectional application programming interface is further configured to send a notification to the third-party subscribers that raw aggregated performance data is available and that the third-party subscriber may initiate the trigger event.

25. The fantasy video gaming system of claim 14, wherein at least one of the raw aggregated performance data and the compiled summation of performance score are sent from the bidirectional application programming interface to the third-party subscriber servers automatically.

26. The fantasy video gaming system of claim 14 wherein the bidirectional application programming interface is further configured to:
receive raw performance data from at least one of the plurality of third-party subscribers relating to at least one game being played on at least one of the plurality of third-party subscriber servers;
determine whether the raw performance data relating to the at least one game being played on at least one of the plurality of third-party subscriber servers is relevant to the at least one fantasy game;
calculate compiled summation of performance scores based on the raw performance data relating to the at least one game being played on at least one of the plurality of third-party subscriber servers; and
transmit the compiled summation of performance scores to the plurality of third-party subscriber servers.

27. A fantasy video gaming system comprising:
a plurality of video gaming servers for hosting a plurality of online video gaming tournaments based on a plurality of video games being played on the video gaming servers;
a plurality of third-party subscriber servers for hosting at least one fantasy game;
a statistical server having a bidirectional application programming interface, the bidirectional application programming interface configured to:
receive raw performance data relating to each of the plurality of video games being played on the video gaming servers;
determine whether the raw performance data relating to each of the plurality of video games being played is relevant to the at least one fantasy game;
aggregate the raw performance data that is determined to be relevant to the at least one fantasy game;
assign a determined weighted calculation on each item within the raw aggregated performance data in order to accommodate for a varying degree of difficulty among the two or more video games being played;
calculate compiled summation of performance scores over all of the video games being played on the video gaming servers based on the raw aggregated performance data wherein the compiled summation of performance scores formulate a level metric for each item within the raw aggregated performance data; and
transmit at least one of the raw aggregated performance data and the compiled summation of performance scores to the third-party subscriber servers for use in the at least one fantasy game;
the statistical server being coupled to the plurality of video gaming servers, being coupled to the third-party subscriber servers, and having a processor for executing program instructions and a memory coupled to the processor for storing the program instructions, the programming instructions comprising:
establishing a plurality of online video gaming tournaments;
accepting by the statistical server entry of a plurality of participants into the plurality of online video gaming tournaments; and
establishing by the bidirectional application programming interface a dynamic participant ranking grid, the dynamic participant ranking grid updating based on performance of each participant of the plurality of participants in-game, wherein a position of individual participants of the plurality of participants on the dynamic participant ranking grid moves during and after the online video gaming tournaments, wherein overall performance of the participant in-game and skill ranking differential between at least two participants determine movement on the dynamic participant ranking grid.

28. The fantasy video gaming system of claim 27, wherein the dynamic participant ranking grid is a multi-level, multi-tier dynamic participant ranking grid.

29. The fantasy video gaming system of claim 27 wherein a participant may comprise one of: an individual participant, a group of participants, and a team of participants.

30. The fantasy video gaming system of claim 27, wherein the bidirectional application programming interface receives raw performance data relating to each of the plurality of video games being played on the video gaming servers automatically.

31. The fantasy video gaming system of claim 27, wherein the bidirectional application programming interface receives raw performance data relating to each of the plurality of video games being played on the video gaming servers in response to a request sent by the bidirectional application programming interface to the video gaming servers.

32. The fantasy video gaming system of claim 27, wherein the bidirectional application programming interface calculates the compiled summation of performance scores over all of the video games being played in response to a trigger event.

33. The fantasy video gaming system of claim 32, wherein the trigger event is initiated by a third-party subscriber.

34. The fantasy video gaming system of claim 32, wherein the bidirectional application programming interface is further configured to send a notification to the third-party subscribers that raw aggregated performance data is available and that the third-party subscriber may initiate the trigger event.

35. The fantasy video gaming system of claim 27, wherein at least one of the raw aggregated performance data and the compiled summation of performance scores are sent from the bidirectional application programming interface to the third-party subscriber servers automatically.

36. The fantasy video gaming system of claim 27, wherein the bidirectional application programming interface is further configured to store the raw aggregated performance data on the statistical server.

37. The fantasy video gaming system of claim 27 wherein the bidirectional programming interface is further configured to:
receive raw performance data from at least one of the plurality of third-party subscribers relating to at least one game being played on at least one of the plurality of third-party subscriber servers;
determine whether the raw performance data relating to the at least one game being played on at least one of the plurality of third-party subscriber servers is relevant to the at least one fantasy game;
calculate compiled summation of performance scores based on the raw performance data relating to the at least one game being played on at least one of the plurality of third-party subscriber servers; and
transmit the compiled summation of performance scores to the plurality of third-party subscriber servers.

38. The fantasy video gaming system of claim 27, wherein the dynamic participant ranking grid is a multi-level, multi-tier dynamic participant ranking grid.

39. The fantasy video gaming system of claim 27, wherein overall performance of the participant in-game and skill ranking differential between at least two participants determine movement on the dynamic participant ranking grid.

40. The fantasy video gaming system of claim 27, wherein the dynamic participant ranking grid defines a 3-dimensional cube.

41. A fantasy video gaming system comprising:
a statistical server having a bidirectional application programming interface, the bidirectional application programming interface configured to:
receive raw performance data relating to at least one game being played on a plurality of video gaming servers;
determine whether the raw performance data relating to the at least one game being played is relevant to at least one fantasy game;
aggregate the raw performance data that is determined to be relevant to the at least one fantasy game;
assign a determined weighted calculation on each item within the raw aggregated performance data in order to accommodate for a varying degree of difficulty among the two or more video games being played;
calculate compiled summation of performance scores over the at least one video game being played on the video gaming servers based on the raw aggregated performance data, wherein the compiled summation of performance scores formulate a level metric for each item within the raw aggregated performance data; and
transmit at least one of the raw aggregated performance data and the compiled summation of performance scores to a plurality of third-party subscriber servers for use in the at least one fantasy game;
the statistical server being coupled to the plurality of video gaming servers, being coupled to the third-party subscriber servers, and having a processor for executing program instructions and a memory coupled to the processor for storing the program instructions, the programming instructions comprising:
establishing at least one online video gaming tournament; and
accepting by the statistical server entry of a plurality of participants into the online video gaming tournament.

42. The fantasy video gaming system of claim 41 wherein the programming instructions further comprises establishing by the bidirectional application programming interface a dynamic participant ranking grid, the dynamic participant ranking grid updating based on performance of each participant of the plurality of participants in-game, wherein a position of individual participants of the plurality of participants on the dynamic participant ranking grid moves during and after the online video gaming tournaments, wherein overall performance of the participant in-game and skill ranking differential between at least two participants determine movement on the dynamic participant ranking grid.

43. The fantasy video gaming system of claim 41, wherein the bidirectional application programming interface is configured to:
receive raw performance data relating to each of two or more games being played on the video gaming servers;
determine whether the raw performance data relating each of the two or more games being played is relevant to the at least one fantasy game;
aggregate the raw performance data that is determined to be relevant to the at least one fantasy game;
calculate compiled summation of performance scores over all of the video games being played on the video gaming servers based on the raw aggregated performance data; and
transmit at least one of the raw aggregated performance data and the compiled summation of performance scores to the plurality of third-party subscriber servers for use in the at least one fantasy game.

44. The fantasy video gaming system of claim 41 wherein a participant may comprise one of: an individual participant, a group of participants, and a team of participants.

45. The video gaming system of claim 41, wherein the bidirectional application programming interface receives raw performance data relating to the at least one video game being played on the video gaming servers automatically.

46. The video gaming system of claim 41, wherein the bidirectional application programming interface receives raw performance data relating to the at least one video game being played on the video gaming servers in response to a request sent by the bidirectional application programming interface to the video gaming servers.

47. The fantasy video gaming system of claim 41, wherein the bidirectional application programming interface calculates the compiled summation of performance scores over the at least one video game being played in response to a trigger event.

48. The fantasy video gaming system of claim 47 wherein the trigger event is initiated by a third-party subscriber.

49. The fantasy video gaming system of claim 47, wherein the bidirectional application programming interface is further configured to send a notification to the third-party subscribers that raw aggregated performance data is available and that the third-party subscriber may initiate the trigger event.

50. The fantasy video gaming system of claim 41, wherein at least one of the raw aggregated performance data and the compiled summation of performance scores are sent from the bidirectional application programming interface to the third-party subscriber servers automatically.

51. The fantasy video gaming system of claim 41 wherein the bidirectional application programming interface is further configured to:
   receive raw performance data from at least one of the plurality of third-party subscribers relating to at least one game being played on at least one of the plurality of third-party subscriber servers;
   determine whether the raw performance data relating to the at least one game being played on at least one of the plurality of third-party subscriber servers is relevant to the at least one fantasy game;
   calculate compiled summation of performance scores based on the raw performance data relating to the at least one game being played on at least one of the plurality of third-party subscriber servers; and
   transmit the compiled summation of performance scores to the plurality of third-party subscriber servers.

52. The fantasy video gaming system of claim 41, wherein the dynamic participant ranking grid is a multi-level, multi-tier dynamic participant ranking grid.

53. The fantasy video gaming system of claim 41, wherein overall performance of the participant in-game and skill ranking differential between at least two participants determine movement on the dynamic participant ranking grid.

54. The fantasy video gaming system of claim 41, wherein the dynamic participant ranking grid defines a 3-dimensional cube.

\* \* \* \* \*